United States Patent [19]

Faulkner

[11] Patent Number: 5,483,601

[45] Date of Patent: * Jan. 9, 1996

[54] APPARATUS AND METHOD FOR BIOMETRIC IDENTIFICATION USING SILHOUETTE AND DISPLACEMENT IMAGES OF A PORTION OF A PERSON'S HAND

[75] Inventor: Keith W. Faulkner, Reading, United Kingdom

[73] Assignees: Keith Faulkner, Berkshire, United Kingdom; Robert Groetzinger, Murten/Morat, Switzerland; Lowell Bergstedt, San Francisco, Calif.

[*] Notice: The portion of the term of this patent subsequent to Aug. 2, 2011, has been disclaimed.

[21] Appl. No.: 282,210

[22] Filed: Jul. 28, 1994

Related U.S. Application Data

[63] Continuation-in-part of Ser. No. 833,015, Feb. 10, 1992, Pat. No. 5,335,288.

[51] Int. Cl.[6] ................................................ G06K 9/00
[52] U.S. Cl. ............................... 382/115; 340/825.34
[58] Field of Search ........................... 382/1, 2, 25, 115, 382/124, 126, 203; 340/825.3, 825.31, 825.34; 356/71

[56] References Cited

U.S. PATENT DOCUMENTS

| 3,648,240 | 3/1972 | Jacoby et al. | 340/146.3 E |
|---|---|---|---|
| 4,206,441 | 6/1980 | Kondo | 340/146.3 E |
| 4,573,193 | 2/1986 | Shuto et al. | 382/2 |
| 4,720,869 | 1/1988 | Wadia | 382/2 |
| 4,736,203 | 4/1988 | Sidlauskas | 340/825.34 |
| 5,025,476 | 6/1991 | Gould et al. | 382/2 |
| 5,073,950 | 12/1991 | Colbert et al. | 382/2 |
| 5,335,288 | 8/1994 | Faulkner | 382/4 |

FOREIGN PATENT DOCUMENTS

93/16441  8/1993  WIPO ..................................... 382/2

Primary Examiner—Leo H. Boudreau
Assistant Examiner—Andrew W. Johns
Attorney, Agent, or Firm—Lowell C. Bergstedt

[57] ABSTRACT

Biometric measuring apparatus for recognizing a person's identity based on measurements performed on the person's hand. An arrangement for producing and storing a silhouette image of at least a portion of a person's hand is combined with an arrangment for producing and storing a displacement image of the same portion of a person's hand to provide measurement data on finger height characteristics. An analyzing device analyzes the silhouette image and the displacement image to produce hand feature data. The apparatus stores hand feature data obtained during a hand enrollment operation cycle and to compare with hand feature data obtained during a subsequent hand bid operation cycle to determine if the person has previously been enrolled on the apparatus.

36 Claims, 12 Drawing Sheets

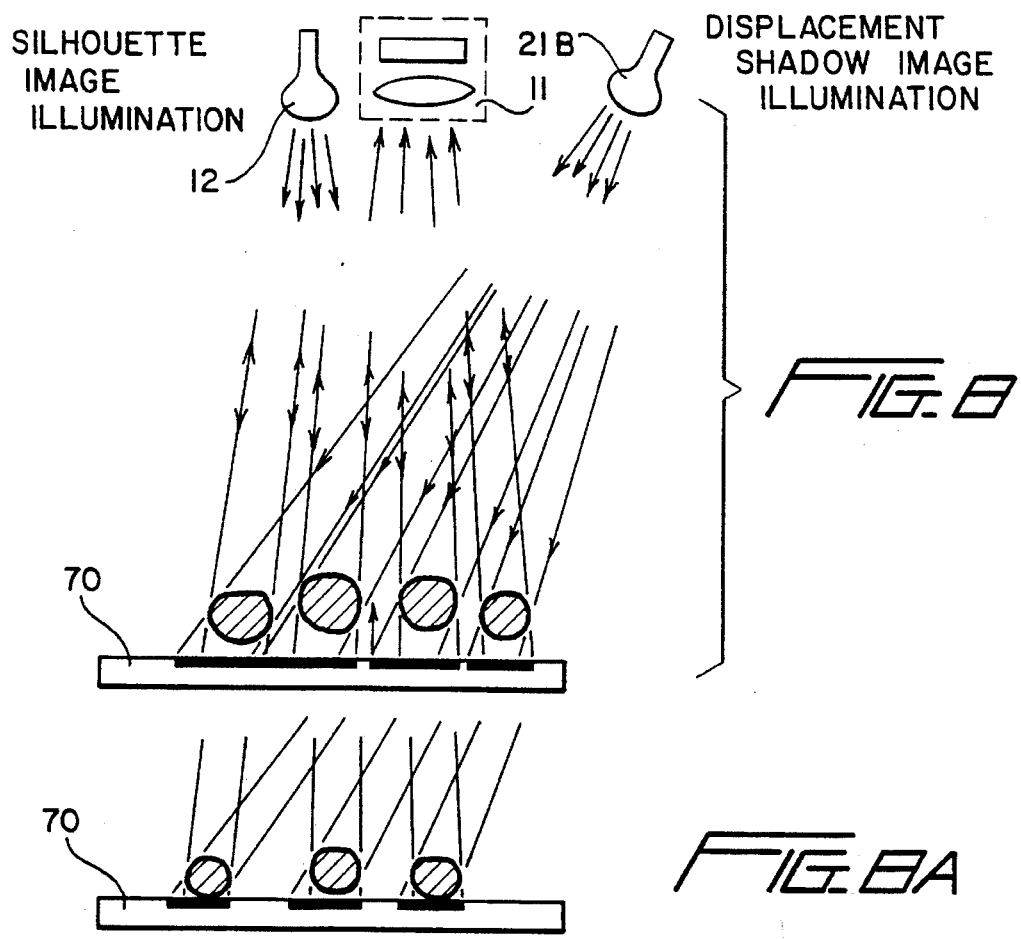
FIG. 8
FIG. 8A
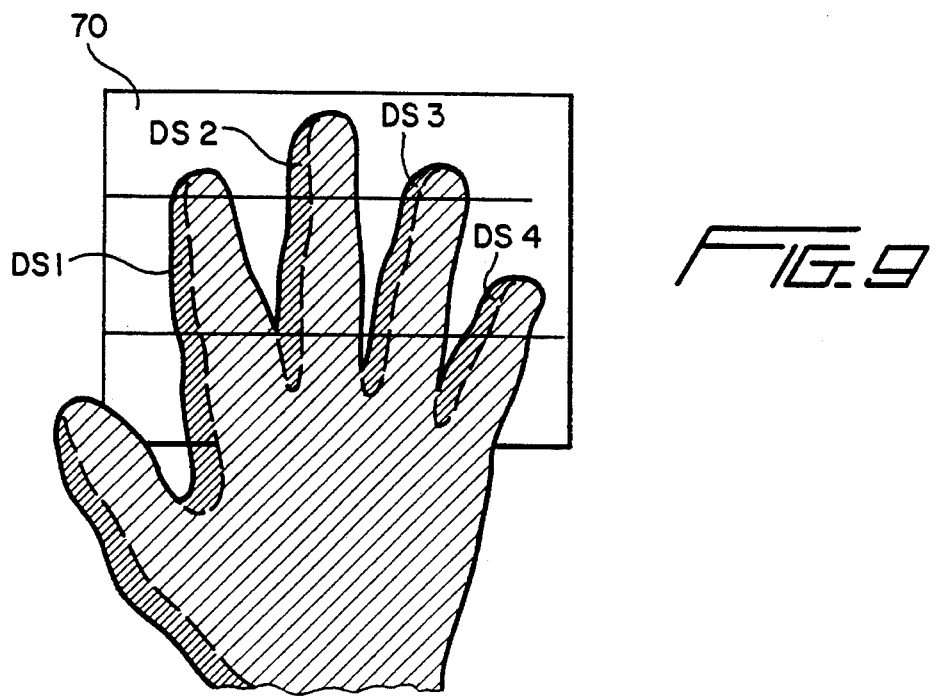
FIG. 9

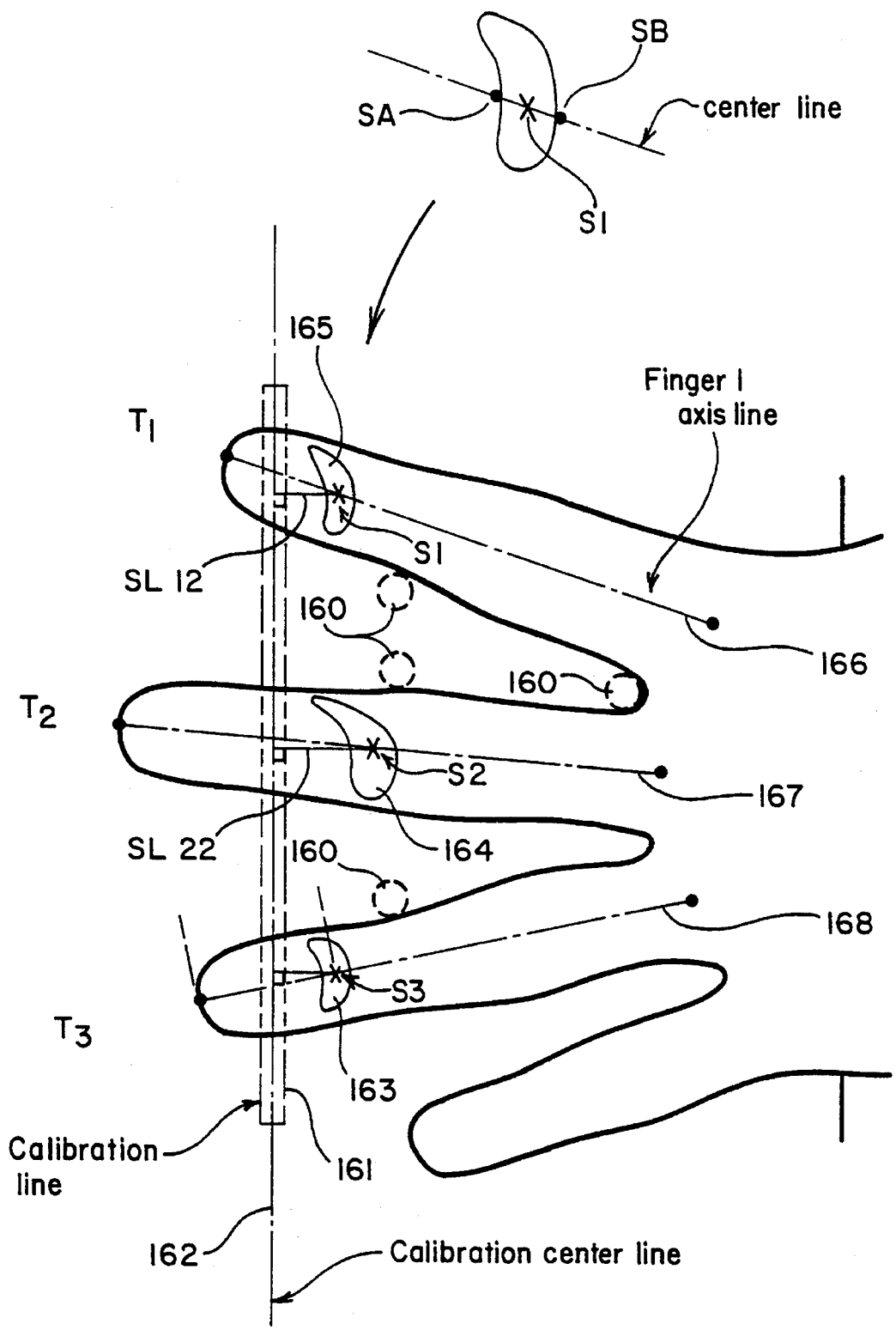

APPARATUS AND METHOD FOR BIOMETRIC IDENTIFICATION USING SILHOUETTE AND DISPLACEMENT IMAGES OF A PORTION OF A PERSON'S HAND

CROSS-REFERENCE TO RELATED APPLICATIONS

This application is a continuation-in-part of prior U.S. patent application Ser. No. 07/833,015, filed Feb. 10, 1992, now U.S. Pat. No. 5,335,288.

FIELD OF THE INVENTION

This invention relates generally to identification methods and systems for use in physical and logical access control systems. Physical access control pertains to systems such as security locks whereas logical access control pertains to electronic systems such as electronic funds transfer, ATM or confidential data base systems. More specifically this invention relates to biometric measuring apparatus and methods for recognizing a person's identity based on measurements performed on the person's hand.

BACKGROUND OF THE INVENTION

Biometric recognition systems generally involve recognition of a person by presentation of some physical characteristic of the person to a machine. These systems have been shown to have value in various security applications including facility access control. Biometric recognition based on hand or palm characteristics has been proposed in a number of prior art references.

Kondo U.S. Pat. No. 4,206,441 discloses a palm pattern detector system and discusses various approaches to hand feature extraction. The system of the Kondo '441 patent utilizes a two dimensional image of the person's hand.

An SRI International Technical Report entitled "Automatic Palmprint Verification Study" by Young & Hammon (RADC-TR-81-161) dated June 1981, discusses approaches to hand feature extraction based on a two dimensional image of the hand.

Shuto U.S. Pat. No. 4,573,193 discloses the use of guide means to assist in reproducible positioning of the hand of the person being measured by the apparatus.

Sidlauskas U.S. Pat. No. 4,736,203 discloses a three dimensional hand profile identification apparatus. A pair of orthogonal retroreflecting surfaces are utilized to present concurrently a plan view and a profile view of a human hand to an imaging system. The addition of a profile view affords the opportunity to extract additional hand feature data, but it consists of an overall hand profile as the third dimensional image and does not provide any basis for extracting a third dimension of feature information on individual fingers.

A commercial version of the Sidlauskas system offered by Recognition Systems, Inc. of San Jose, Calif. is sold under the trademark "Handkey." The Handkey system also uses hand positioning guides on its retroflective platen to aid in reproducible finger positioning during both the hand enrollment operation cycle and the hand bid operation cycle.

Hand enrollment involves performing an initial measurement on a person's hand and storing the hand feature data extracted as hand enrollment data. Hand bidding involves a subsequent presentation of the person's had to the machine and the hand feature data extracted during the hand bid operation cycle is hand bid data. The machine compares the hand bid data with the hand enrollment data to decide if the same hand was used to produce both sets of data. Typically the hand bid operation cycle also involves manual input of some identification data by the person doing the bidding, such as entry of a PIN code on a keypad or swipe of a magnetic data card through a card reader.

While the Handkey system has proven its effectiveness in various security applications, there is need for further improvement in the discrimination ability and corresponding accuracy of biometric measuring apparatus of this type.

OBJECTS OF THIS INVENTION

It is the principal object of this invention to provide improved biometric measuring apparatus and methods.

It is another object of this invention to provide improved three dimensional biometric measuring apparatus and methods.

It is a further object of this invention to provide a three dimensional biometric measuring apparatus which provides measurements of finger height characteristics on individual fingers in addition to other hand geometry features.

FEATURES AND ADVANTAGES OF THIS INVENTION

In one broad general aspect, this invention features apparatus for recognizing a person's identity based on measurements performed on the person's hand with the apparatus generally comprising the combination of means for producing a silhouette image of at least a portion of a person's hand, means for producing a displacement image of the same hand portion, means for analyzing the images to produce hand feature data; and means for comparing hand feature data obtained during a bid cycle with hand feature data obtained during a previous enrollment cycle to determine if the person was previously enrolled.

This invention may also be viewed as a method of recognizing a person which involves the steps of a) capturing a silhouette image of at least a portion of a person's hand; b) capturing a displacement image of the hand portion; c) analyzing the silhouette image and displacement image to produce hand feature data; and d) comparing hand feature data obtained during a bid cycle with hand feature data obtained during a previous enrollment cycle to determine if the person was previously enrolled.

The advantage of using a combination of a silhouette image and a displacement image is improved discrimination and accuracy in recognizing the person from hand geometry features. The term "silhouette image" here is used to signify any image which comprises dark and light contrast between the hand portion in the image and the image background plane. In other words, the hand portion can be dark and the background light, or alternatively, the hand portion can be light and the background dark.

Another aspect of this invention features biometric measuring apparatus for recognizing a person's identity based on three dimensional measurements performed on the person's hand including measurements of finger height characteristics on one or more individual fingers. The apparatus comprises means for producing and storing a silhouette image of at least a portion of a person's hand including a plurality of fingers, and means for producing and storing a displacement image of the same portion of a person's hand which can be correlated with the stored silhouette image to provide measurement data on finger height characteristics. The apparatus further comprises means for analyzing the stored silhouette image and the stored displacement image to produce hand feature data. Hand enrollment data is stored in the apparatus and comprises hand feature data obtained during a hand enrollment operation cycle. Hand bid data is stored and comprises hand feature data obtained during a hand bid operation cycle. A comparison means compares hand bid data with hand enrollment data to decide on the basis of prearranged decision criteria whether the hand bid data and the hand enrollment data were produced by the same hand portion.

The advantage of obtaining finger height characteristics on individual fingers using a displacement image approach is that both the hand enrollment data and the hand bid data can incorporate hand feature data based on a larger number of features. This provides improved discrimination in the process of comparing hand enrollment data and hand bid data and result in an overall improvement in accuracy of the machine.

In one embodiment, the system includes support means for supporting a portion of a person's hand including at least a plurality of fingers in spread positions. The means for producing and storing a silhouette image comprises the combination of image capture means for viewing the hand portion and the support means from a prearranged first direction, illumination means for illuminating the hand portion and the support means to present a silhouette image of the hand portion to the image capture means, and storage means for storing at least a portion of the silhouette image presented to the image capture means.

The means for producing and storing a displacement image comprises the combination of image capture means for viewing the hand portion and the platen from a prearranged second viewing direction, illumination means for directing a structured light pattern onto at least one of the fingers from a prearranged direction substantially different from the second viewing direction to present to the image capture means a displacement image comprising an element of the structured light pattern striking a surface region of at least one of the fingers at a position displaced from a precalibrated striking position on a predefined background plane in the absence of the finger, the magnitude of the position displacement providing the finger height characteristic data; and storage means for storing at least a portion of the displacement image.

The term "structured light" is used to signify Illumination with a controlled divergence and angle of incidence, generally with these characteristics:

1. illuminates only selected portions of the field of view;

2. arranged so that it is not coaxial with the line of view of the image image capture means; and 3. is intended for use in three dimensional profile measurement.

By using a structured light pattern which illuminates the fingers from above, finger height characteristic data on individual fingers is achieved without requiring an additional reflective surface or a mirror in the region of the support means or platen. This enables the overall platen and optics to occupy a substantially smaller volume. The complexity of the structured light pattern can be tailored to system requirements for discrimination and accuracy. Sufficient discrimination and accuracy can enable the system to operate in an auto-identification mode, i.e. a mode in which the system itself identifies the person as one of a plurality of enrolled persons by comparing the hand bid data with a plurality of sets of hand enrollment data. Elimination of the requirement to enter manually an identification code makes system operation more simple and user friendly. An equivalent level of discrimination can be achieved by using more finger height characteristics features and fewer fingers, enabling a further reduction in platen size and optical system volume.

A further refinement in this case can be to use very fine structured light elements directed onto areas which include the finger knuckles. These can be used to generate knuckle location and profile characteristics which can provide further hand feature data.

Another embodiment of this invention features the same combination of elements as set forth above to produce the silhouette image, but the combination of elements that produce the displacement image comprise the same image capture means, and a second illumination means for illuminating the hand portion and the platen from a direction substantially different from the prearranged direction to present a displaced shadow image of the hand portion to the image capture means, the displaced shadow image having the outline of one side of each of the fingers of the hand portion displaced from the corresponding portion of the silhouette image and providing finger height characteristic data.

The finger height characteristic data here is different from that produced by a structured light pattern in the previously discussed embodiment, but provides the same facility for extracting hand feature data related to a third dimension. Thus the advantage of additional hand feature data and accompanying improvements in discrimination and accuracy is also present in this case. The displaced shadow image is of approximately the same size and form as the silhouette image and may therefor be analyzed in a similar manner to the silhouette image. Alternatively, a more direct method to generate width difference data can be employed.

In a specfic and currently preferred embodiment of the invention, the support means is a platen having a substantially retro-reflective surface. The area of the platen is preselected to accomodate the entire length of two fingers of a hand placed thereon and the platen surface is curved to accomodate the natural curvature of human fingers in a relaxed state. This form of platen has the advantage of achieving reproducible finger size and area and finger height characteristics since the fingers will lie more naturally on the platen with bottom surfaces in contact with the platen surface without pressure that deforms the fleshier parts of the fingers to be wider than they are in a natural, undeformed state.

In this embodiment the first illumination means is a combination of a circular array of light sources mounted in a position above the back portion of the platen and a mirror mounted in a position above the light sources. The light sources are directed upward toward the mirror at an angle and reflect from the mirror to the platen to produce a substantially uniform flood lighting of the platen and any hand portion placed thereon. The image capture means comprises an image forming lens and an image sensing device mounted coaxial with the circular array of light sources and having a viewing direction toward the mirror for capturing a mirror reflected image of the platen and any hand portion placed thereon.

In this preferred embodiment, the second illumination means comprises a light source array comprising at least a pair of light emitting diodes, a light baffling arrangement for the LEDs, a lens for forming the LED light into structured light beams and a second mirror for directing the structured light beams onto the platen. The light source and baffle arrangement mounts the pair of light emitting diodes in side by side relation at a position above and to one side portion of the platen and below the mirror. It provides a forward baffle structure to form light from the diodes into a light beam directed generally parallel to the mirror and blocking light from the diodes from directly striking the mirror or the platen which would form unwanted light patterns. The lens is mounted forward of a front edge of the mirror to avoid obstructing the view of the platen. The second mirror is mounted forward of the lens and directs the structured line beam pattern onto the platen at a prearranged position adapted for striking at least one finger placed on the platen.

In a specific version of this preferred embodiment, the lens is a cylindrical lens to focus light from the pair of diodes into a line segment beam. The cylindrical lens and second mirror combine to focus the line segment beam and direct the line segment beam onto the platen at a region such that the line segment beam intersects each of two fingers positioned on the platen. Preferrably, the light source array comprises a plurality of pairs of light emitting diodes and the light baffle means supports each of the pairs of light emitting diodes at vertically separated positions. The baffle arrangement has separate forward baffle structures associated with each pair of LEDs to form light emitted from each of the associated pairs of diodes into separate beams directed through the cylindrical lens onto the second mirror and to block emitted light from directly striking the mirror or the platen. The cylindrical lens and the second mirror combining to focus each of the separate beams into line segment beams and to direct the line segment beams onto the platen such that each of the line segment beams intersects fingers positioned on the platen at different positions along the axis of each of the fingers. The cylindrical lens is mounted in its own baffle arrangement which precludes light from the diodes directly striking the second mirror without passing through the lens and thereby precludes forming unwanted light patterns on the platen.

The preferred embodiment also employs a finger guide means mounted on the platen for defining finger placement positions and thereby to assist a person in achieving consistently reproducible finger orientations during a hand bid operation cycle and thereby defining finger location regions on the platen. The lens forms the light from the light source array into a structured light pattern comprising a plurality of separate light beams which are directed by the second mirror into small light spots illuminating the platen at preselected points within the finger location regions.

This feature provides the advantage of increasing the reproducibility of finger positioning relative to the location of the structured light pattern elements which provide the finger height characteristic data. This improves the overall discrimination capability of the system.

Another aspect of this invention features a method for recognizing a person's identity based on measurements performed on the person's hand. This method includes the step of disposing a support means on which at least a portion of a person's hand including a plurality of fingers may be placed. By illuminating the support means and the hand portion thereon with a substantially uniform flood of light, a silhouette image of the hand portion is produced and the method also includes capturing and storing silhouette image data representing the silhouette image. Another step of the method is illuminating the support means and the hand portion with a light source which produces a displacement image of the hand portion which can be correlated with the silhouette image to produce measurement data on finger height characteristics. Displacement image data representing the displacement image is captured and stored and then the stored silhouette image data and the stored displacement image data are analyzed to produce hand feature data.

The method aspect of this invention also features performing this series of steps recited above during a hand enrollment operation cycle to produce hand enrollment data and also during a hand bid operation cycle to produce hand bid data. The method also includes comparing the hand bid data with the hand enrollment data to decide on the basis of prearranged decision criteria whether the hand bid data and the hand enrollment data were produced by the same hand portion.

The method of this invention thus produces the same advantages as are set forth above relative to the apparatus of the invention. These will not be repeated here.

Other objects, features and advantages of this invention will be apparent from a consideration of the detailed description of various embodiments which is set forth below.

BRIEF DESCRIPTION OF DRAWING FIGURES

Figure 6:
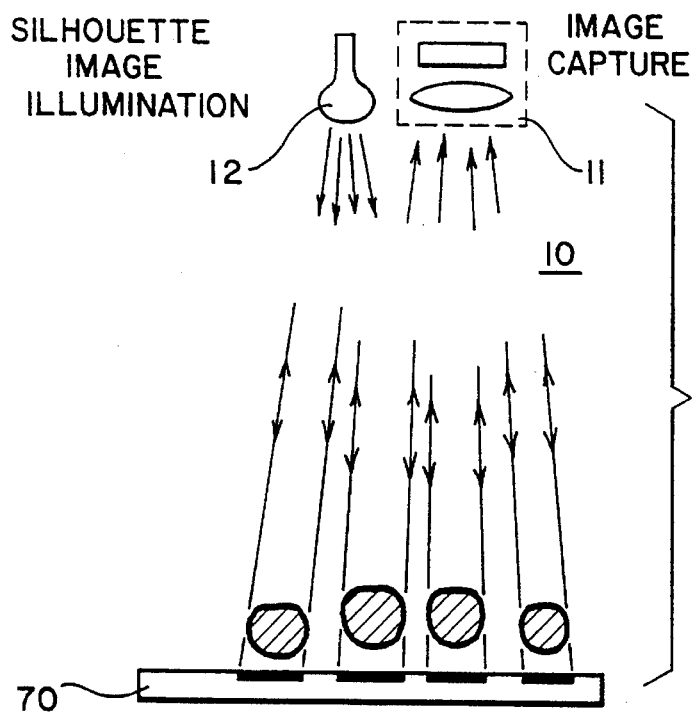
Figure 6A:
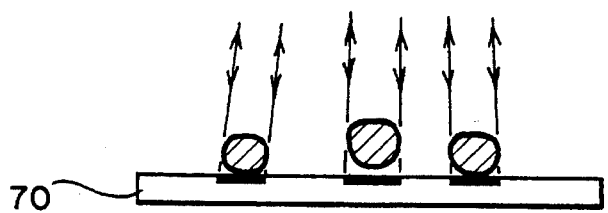
Figure 7:
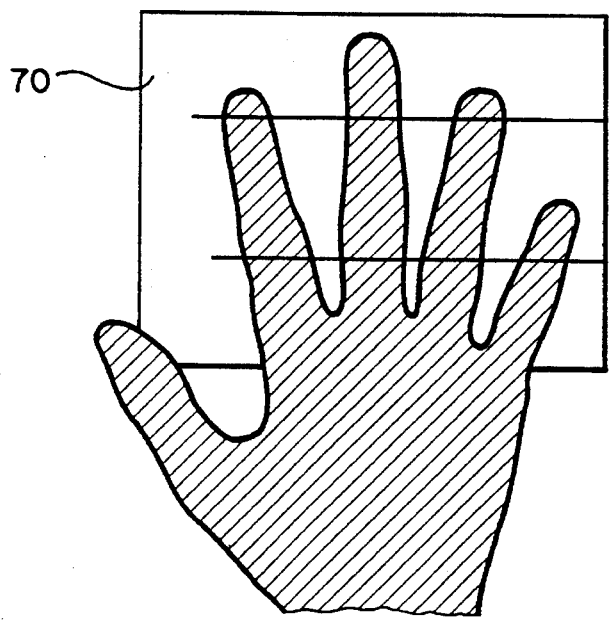

FIGS. 6–9, including FIGS. 6A and 8A, are schematic views of apparatus elements of an alternative embodiment of this invention which are useful in illustrating the general principles of the invention.

Figure 10:
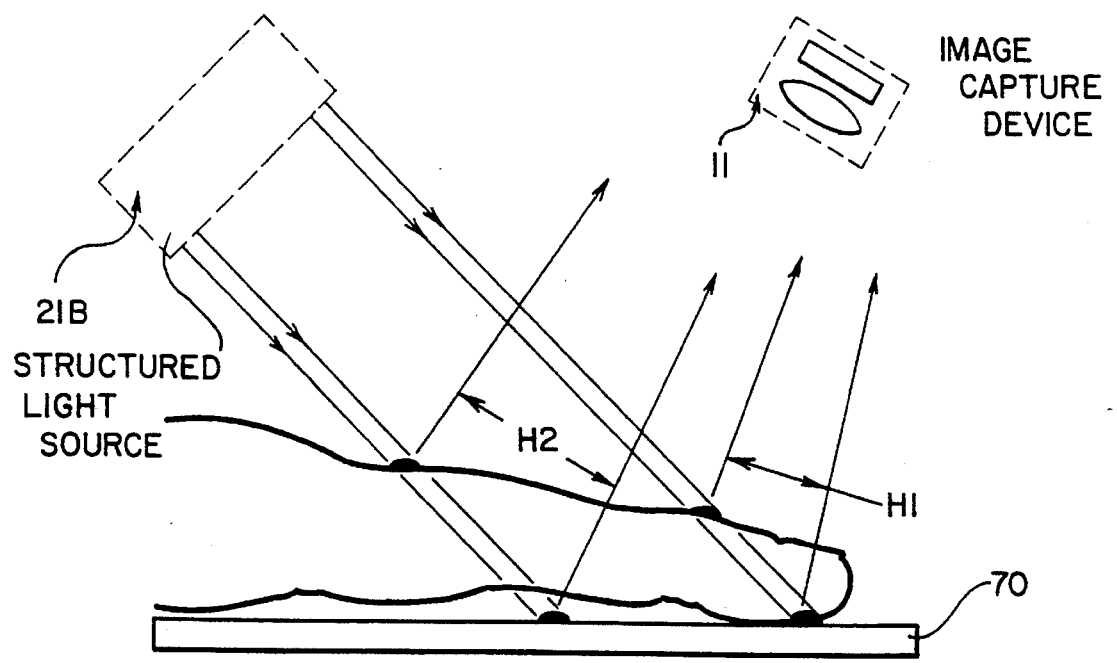
Figure 11:
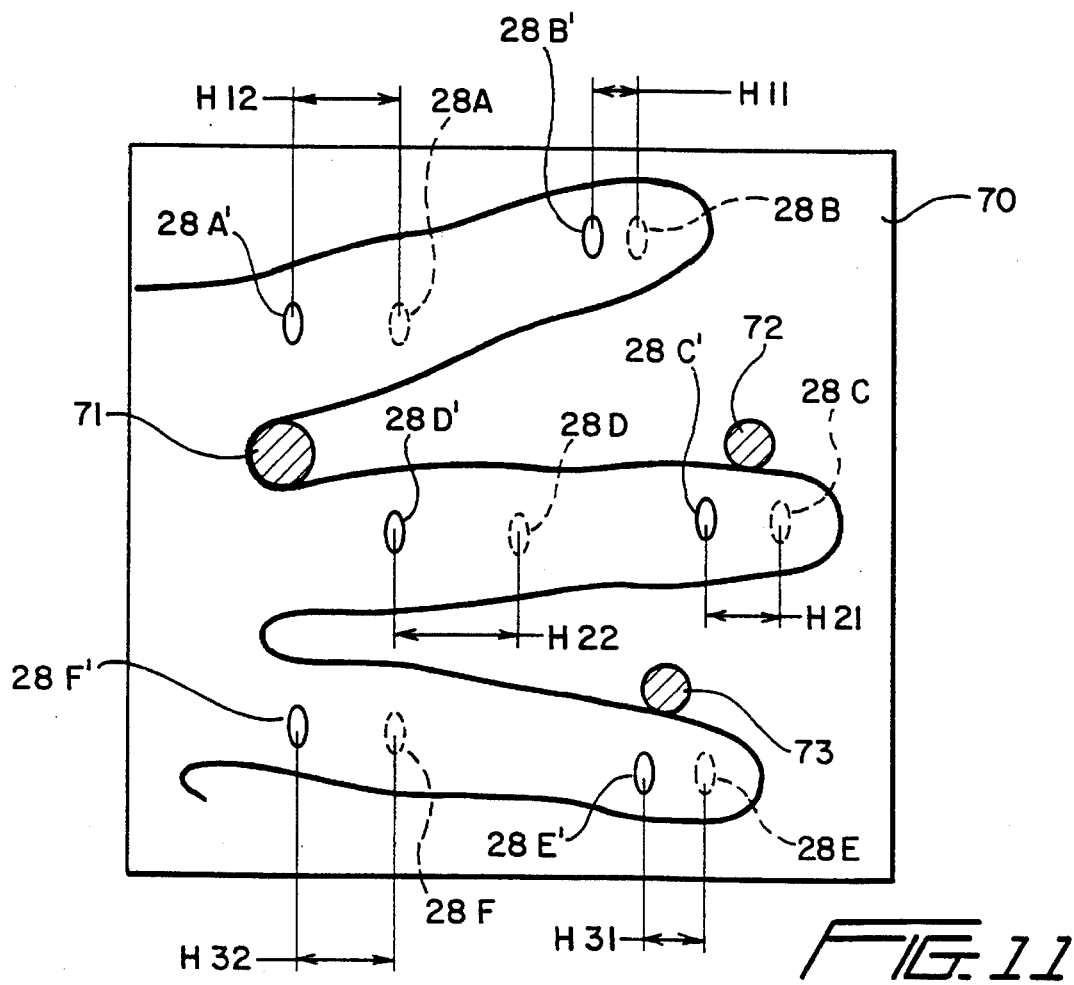

FIGS. 10 and 11 are schematic views of portions of the apparatus elements of another alternative embodiment of this invention which are useful in illustrating the general principles of the invention.

Figures 12A, 12B:
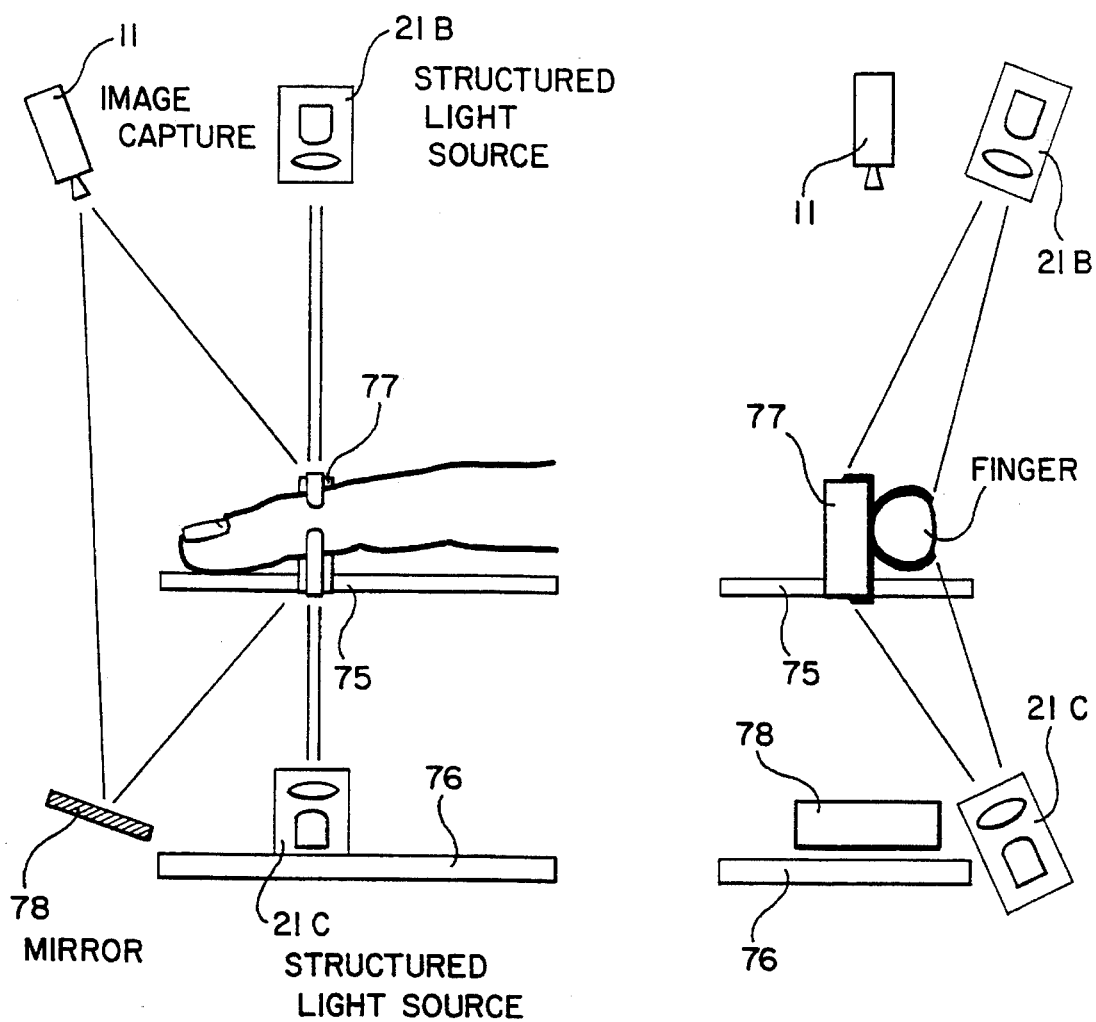

FIGS. 12A and 12B are schematic views of portions of the apparatus elements of another alternative embodiment of this invention which are useful in illustrating that the general principles of the invention can be applied in a double sided viewing arrangement.

Figure 13:
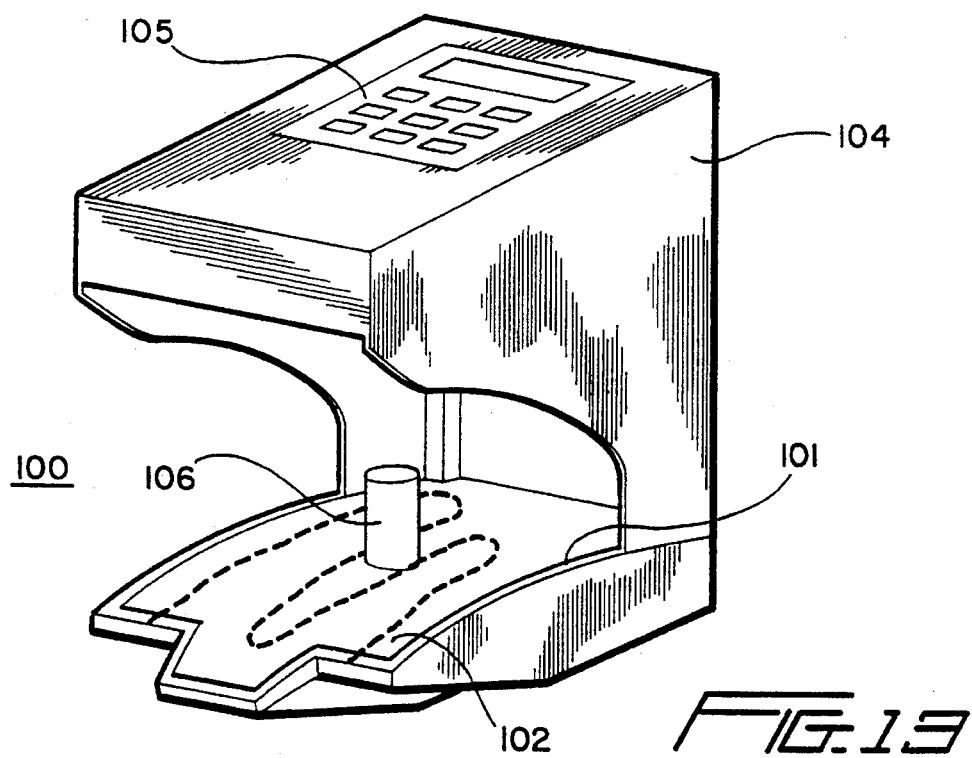

FIG. 13 is an isometric view of one embodiment of apparatus in accordance with this invention which provides for use of two fingers of a person's hand.

Figure 14:
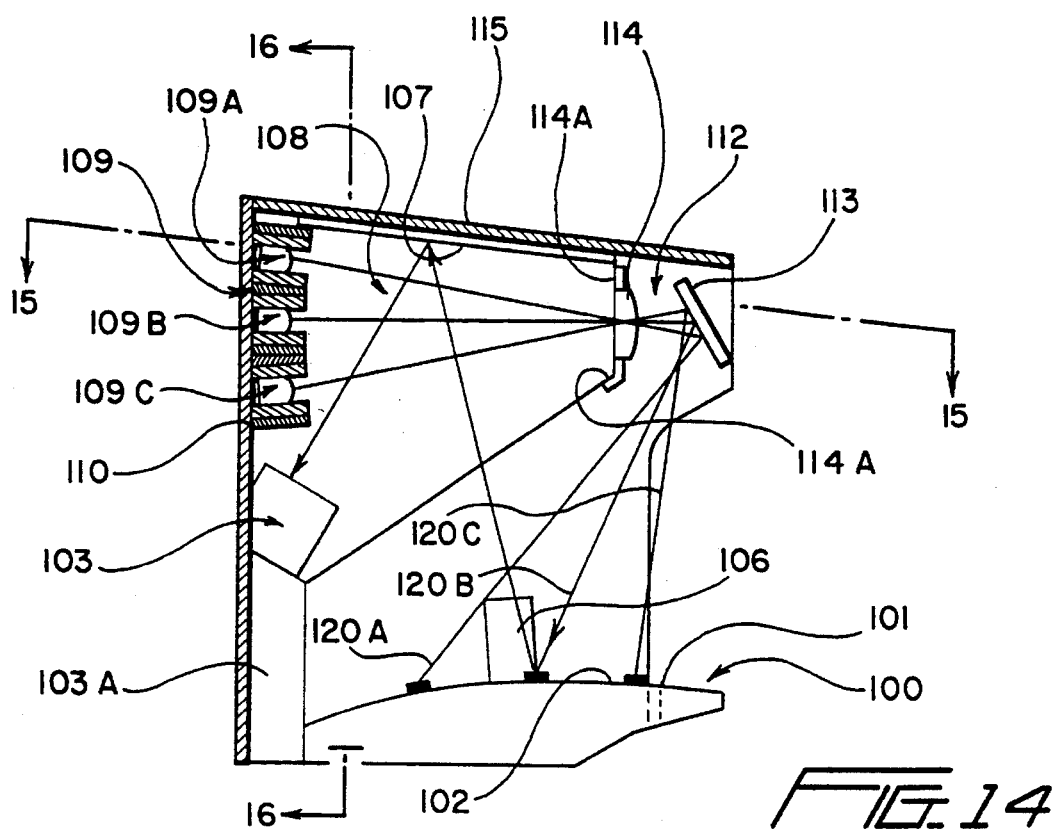

FIG. 14 is a partly sectioned side elevational view of the apparatus of FIG. 13 illustrating elements and components of one embodiment of this invention.

Figure 15:
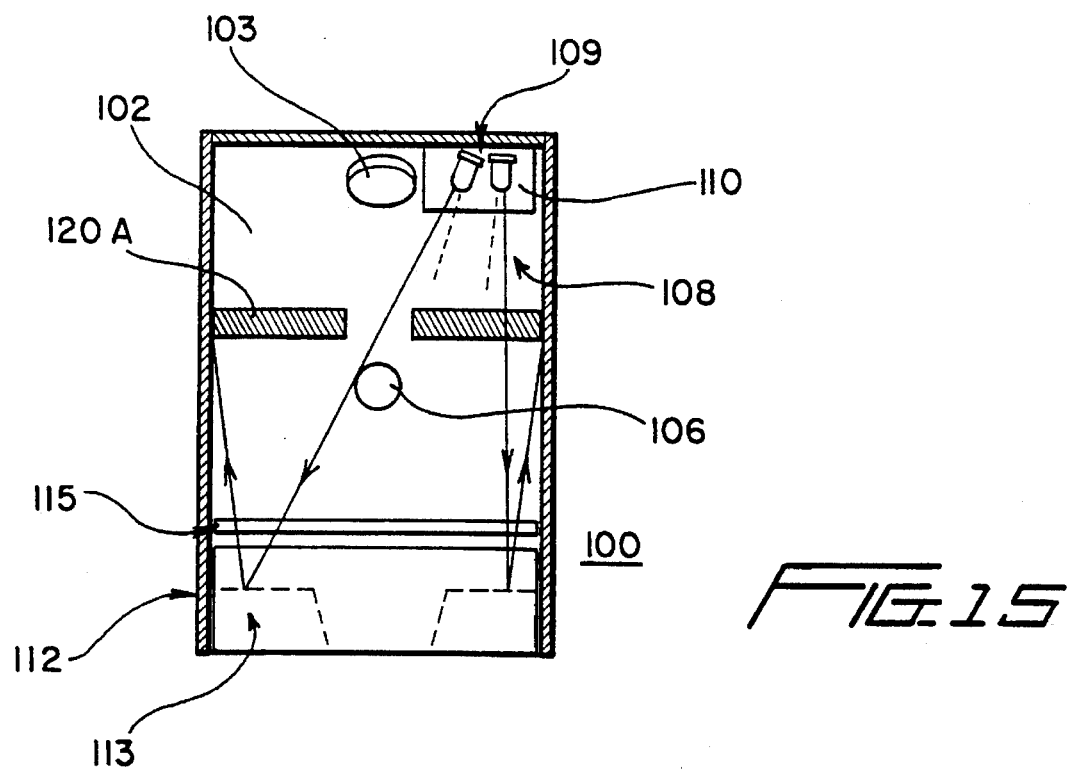

FIG. 15 is a top section view of the apparatus of FIG. 13 generally taken along the lines 15—15 in FIG. 13 and illustrating production of one line of a structured light pattern in accordance with this invention.

Figure 16:
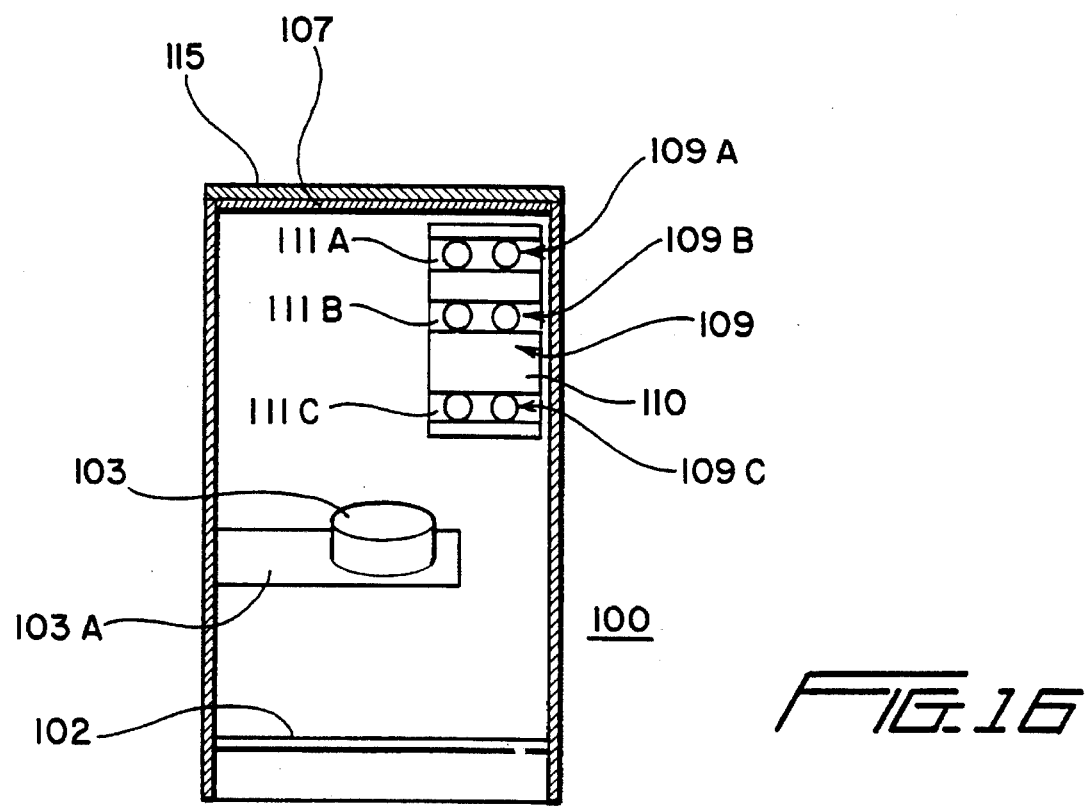

FIG. 16 is a partly sectioned side view of the apparatus of FIG. 13 taken generally along the lines 16—16 in FIGS. 14 and showing arrangements of components for producing a structured light pattern comprising three lines.

Figure 17:
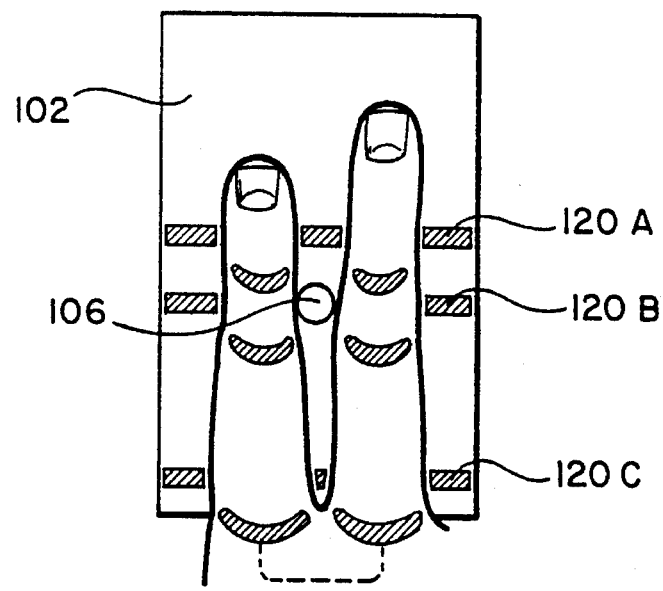

FIG. 17 illustrates the structured light pattern produced by the system of FIGS. 13–16 and the result of that pattern on fingers placed in the apparatus.

Figure 18:
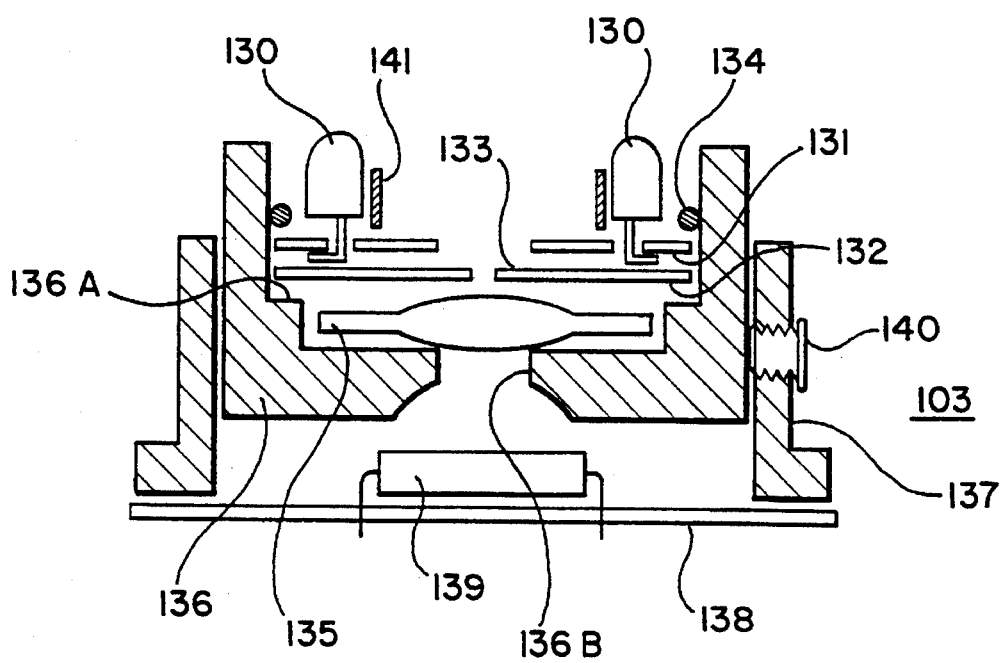

FIG. 18 is a partly sectioned elevation view of an illumination and image capture assembly useful in this invention in general and, specifically, in the apparatus shown in FIGS. 13–17.

Figure 19:
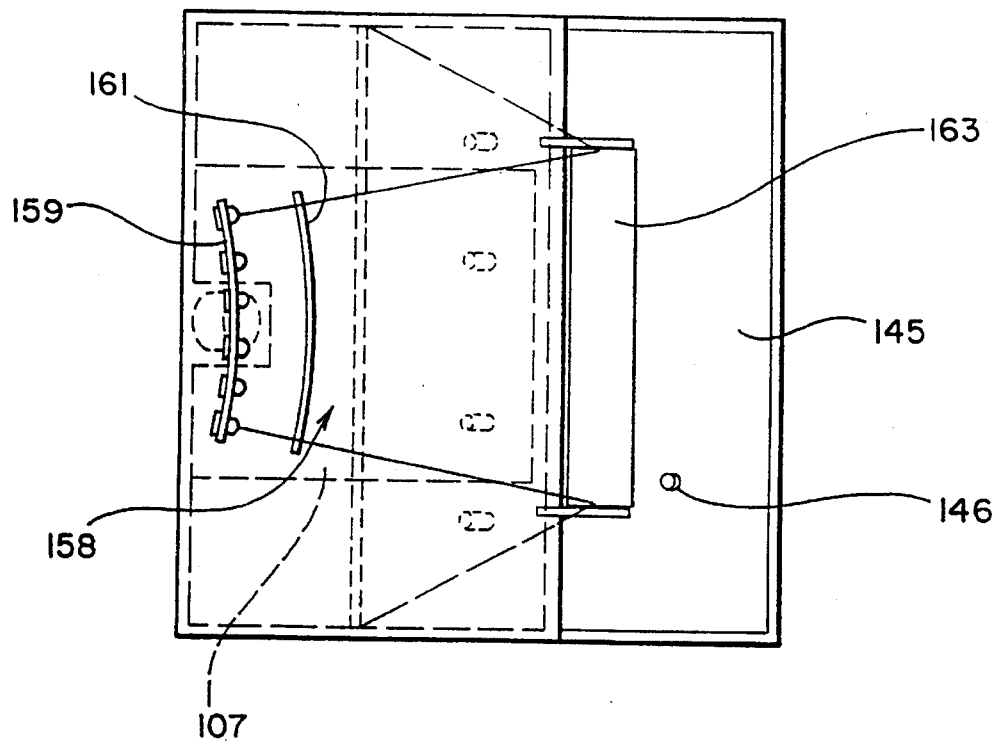
Figure 20:
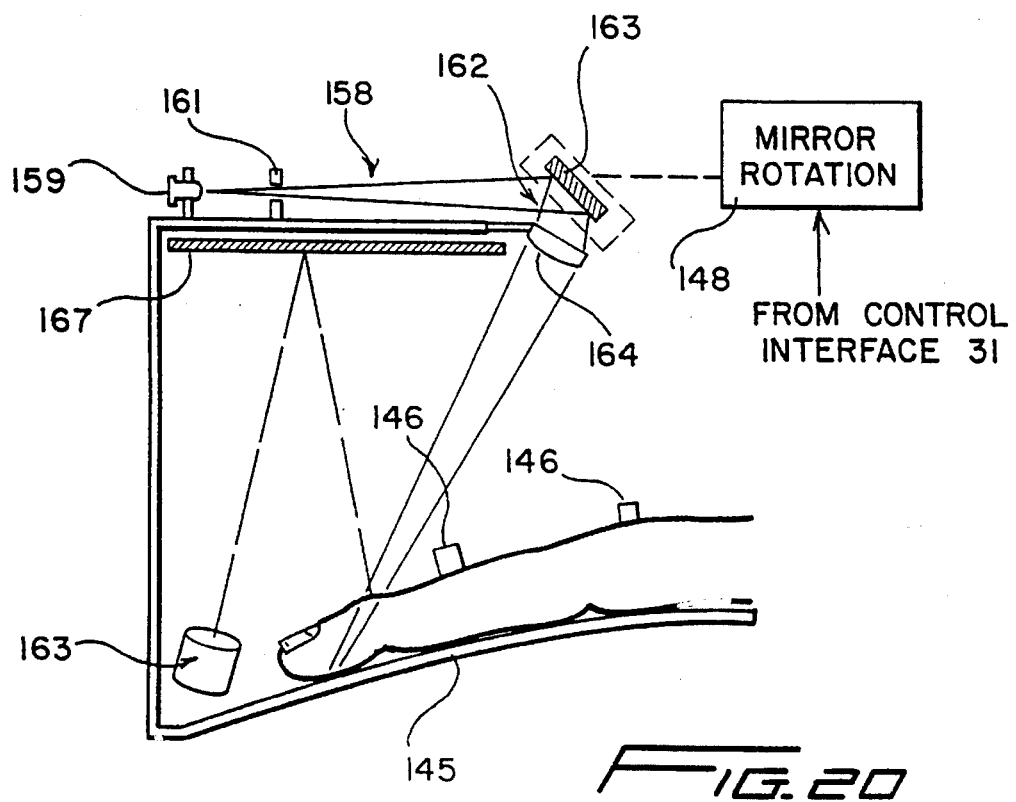

FIGS. 19 and 20 are top and partly section side views of an alternative embodiment of this invention using a different form of apparatus to produce a structured light illumination.

FIGS. 21 and 21A are diagrams useful in explaining certain features of image analysis in accordance with one embodiment of this invention.

Figure 22:
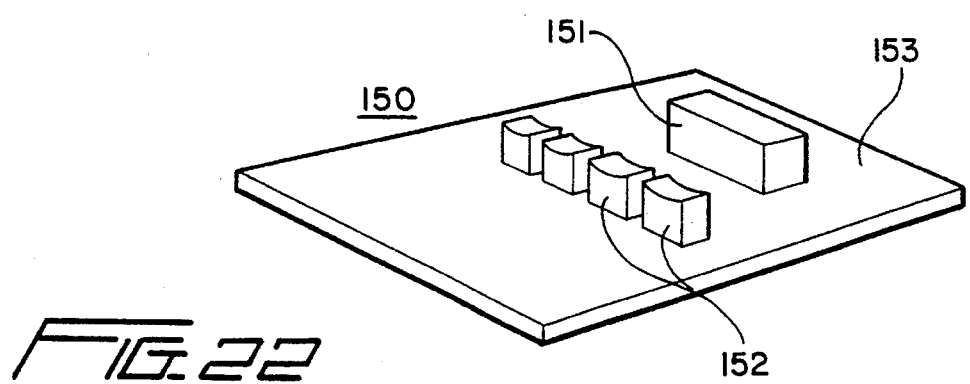

FIG. 22 is a perspective view of a palm and finger support arrangement useful in accordance with one embodiment of this invention.

DETAILED DESCRIPTION OF EMBODIMENTS

General Principles of the Invention

From an apparatus viewpoint, this invention is a biometric measuring system for recognizing a person's identity based on measurements performed on the person's hand. The term "biometric" generally refers to use of measurements of a person's physical characteristics as a basis for recognition of the person, typically by a machine.

The phrase "recognizing a person's identity" is used in a general sense to cover two different but related concepts involving comparing currently obtained biometric feature data with previously stored biometric feature data: 1. using the person's hand, in this case, to verify that he is the enrolled person that he claims to be; and 2. using the person's hand to identify the person as one of the persons who are enrolled on the system. The differences and the meaning of these two concepts will be discussed in more detail below.

The broad conceptual principles of this invention will first be described in connection with FIGS. 1–11 and then a detailed description of an actual apparatus embodiment of the invention will be given.

This invention, in one broad conceptual sense includes these elements:

a. means for producing and storing a silhouette image of at least a portion of a person's hand including a plurality of fingers.

Referring to FIGS. 1–11, it is seen that "means" referred to here are designated with the reference numeral 10 and generally involve use of a silhouette image illumination means 12 and an image capture means 11 for producing a silhouette image and silhouette image store 13 as the means for storing that silhouette image. Control interface means 31 also serves as part of this means in the sense that it controls the operation of the silhouette image illumination means 12 and the image capture means 11 and the silhouette image store means 13.

b. means for producing and storing a displacement image of the same portion of a person's hand which can be correlated with said stored silhouette image to provide measurement data on finger height characteristics;

The "means" referred to here are designated with the reference numeral 20 and generally involve the use of a displacement image illumination means 21 and image capture means 11 (or a separate image capture means, as an alternative) for producing a displacement image. Displacement image store means 21A is the means for storing that displacement image. Control interface means 31 also serves as part of this means in the sense that it controls the operation of the displacement image illumination means 12 and the image capture means 11 and the displacement image store means 21A.

The term "displacement image" is used as a generic descriptor for an image that involves a geometric displacement of some portion of the image due to the relationship between the illumination means and the finger structure with the amount of the displacement related to the "finger height characteristics" at the point or region that the displacement has occurred.

Two different types of displacement image illumination means and two different types of displacement image are shown in tile embodiments of FIGS. 1–4 and FIGS. 6–9. The "displacement image" is taken with reference to a background image plane, usually but not necessarily a platen on which the person's hand is resting. The term "finger height characteristics" is used rather than "finger thickness characteristic" to reflect the fact that, in some cases, the person's fingers may not be in contact with the platen or may not have their bottom surfaces all in the background image plane. Thus "finger height characteristics" relates to the height above the platen of the finger portion producing the image displacement characteristic or, more generally, the height above the background image plane. The meaning of these terms will become more clear from the detailed description below of the two embodiments.

The phrase "correlated with said stored silhouette image" is used in a general sense to refer to the ability to use information from the silhouette image to determine what portion of the displacement image relates to what portion of the silhouette image. It also signifies the ability to use information from the silhouette image to select a point or region of the displacement image to analyze or perform some measurement on relative to extraction of some hand feature data element. The meaning of this will be more clear from the detailed description of the two different displacement image types and characteristics given below. It is advantageous if the time interval to capture all of the images is small enough such that no significant hand movement could occur, but the invention is not restricted to such a case. It should be understood that spatial correlation of the two images is implicit if the same image capture means is utilized for both images. If separate image capture means were used, then some reference marks viewable by both imaging capture means are likely to be required to permit accurate correlation of the images.

c. means for analyzing said stored silhouette image and said stored displacement image to produce hand feature data, including hand feature data derived at least in part from finger height characteristics.

The "means" referred to here is the image analyzer means 30 (FIG. 5) which functions together with the control interface means 31 which controls the reading of the stored image information from silhouette image store means 13 and displacement image store means 21A. The image analyzer means 30 basically performs hand feature extraction and places the extracted feature data in one of the hand enrollment data store means 40 or the hand bid data store means 50.

d. means for storing hand enrollment data comprising said hand feature data obtained during a hand enrollment operation cycle.

This "means" is the hand enrollment data store means 40 together with the control interface means 31 which determines whether this is a hand enrollment data cycle or a hand bid data cycle and thus controls placing the hand feature data into hand enrollment data store means 40 rather than the hand bid data store means 50.

e. means for storing hand bid data comprising said hand feature data obtained during a hand bid operation cycle This "means" is the hand bid data store means 50 together with the control interface means 31 which determines whether this is a hand enrollment data cycle or a hand bid data cycle and thus controls placing the hand feature data into the hand bid data store means 50 rather than the hand enrollment data store means 40.

f. means for comparing hand bid data with hand enrollment data to decide on the basis of prearranged decision criteria whether said hand bid data and said hand enrollment data were produced by the same hand portion.

This "means" is the comparison and decision means 60 which functions along with control interface means 31 to take the hand feature data from both the hand enrollment data store means 40 and the hand bid data store means 50 and compare it using a decision criteria to make a decision on whether the hand feature data in each is essentially the same.

To distinguish or differentiate the principles of the invention incorporated into the two different embodiments of FIGS. 1–5 and FIGS. 5–9, the following discussion will be illustrative.

Figure 1:
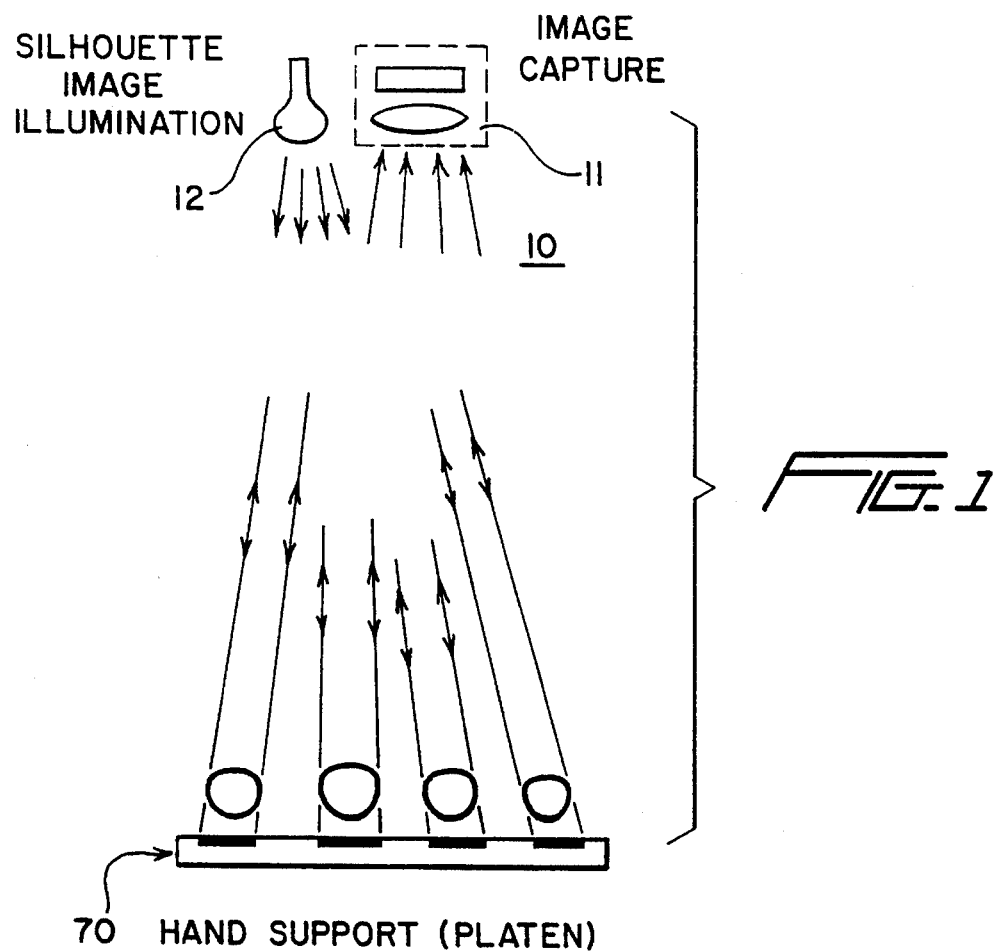
FIGS. 1–4 are schematic views of portions of the apparatus elements of one embodiment of this invention which are useful in illustrating the general principles of the invention.
Figure 2:
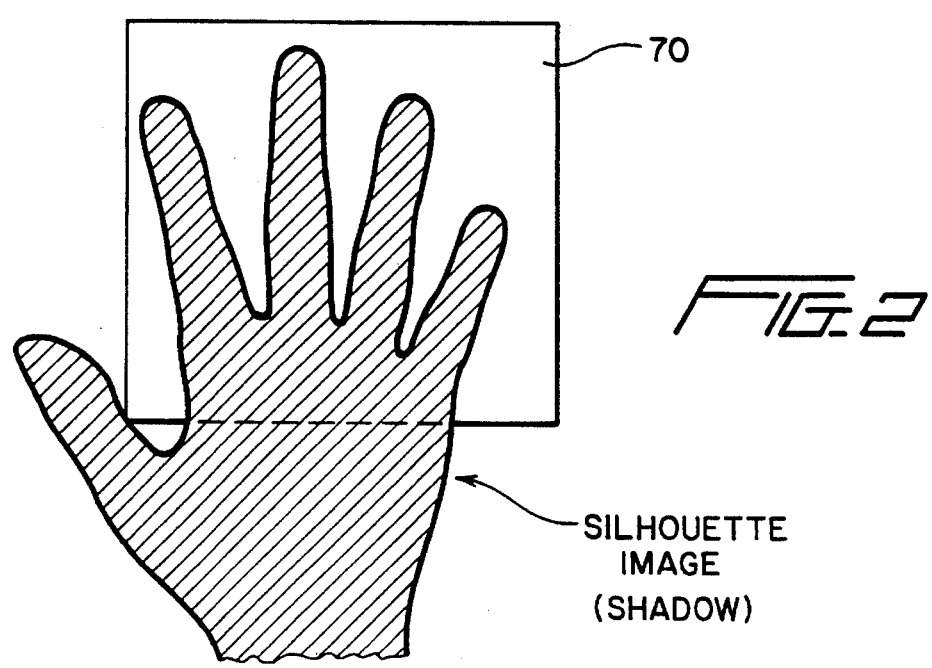
Figure 3:
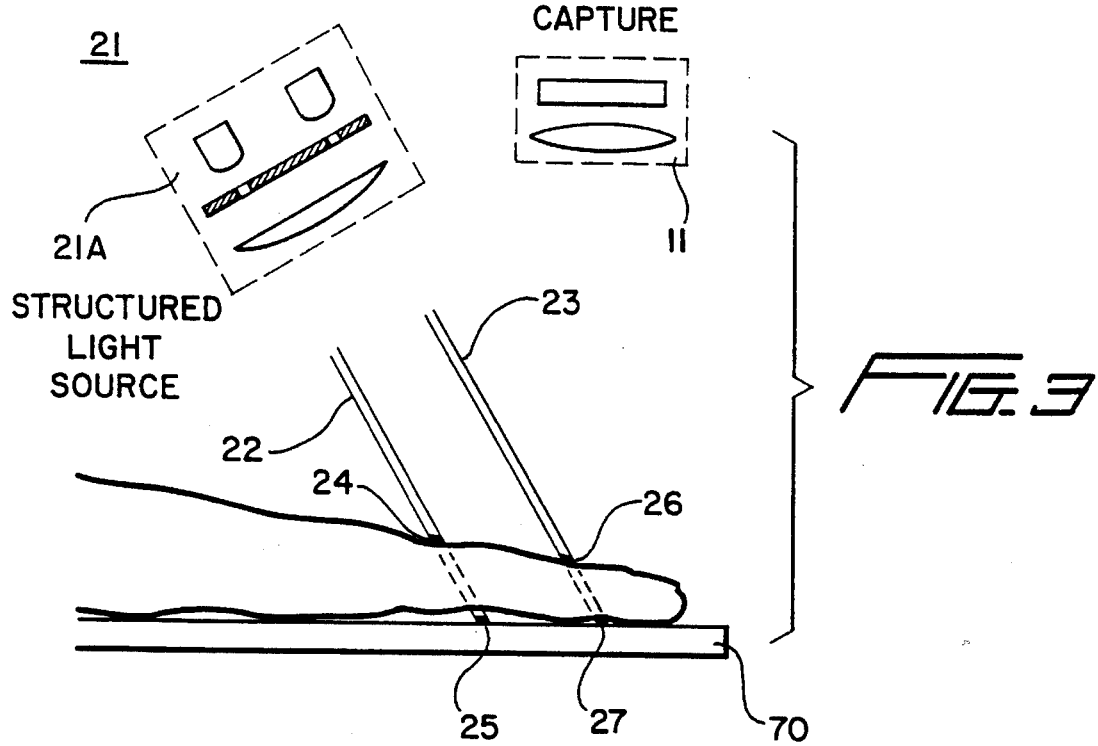
Figure 4:
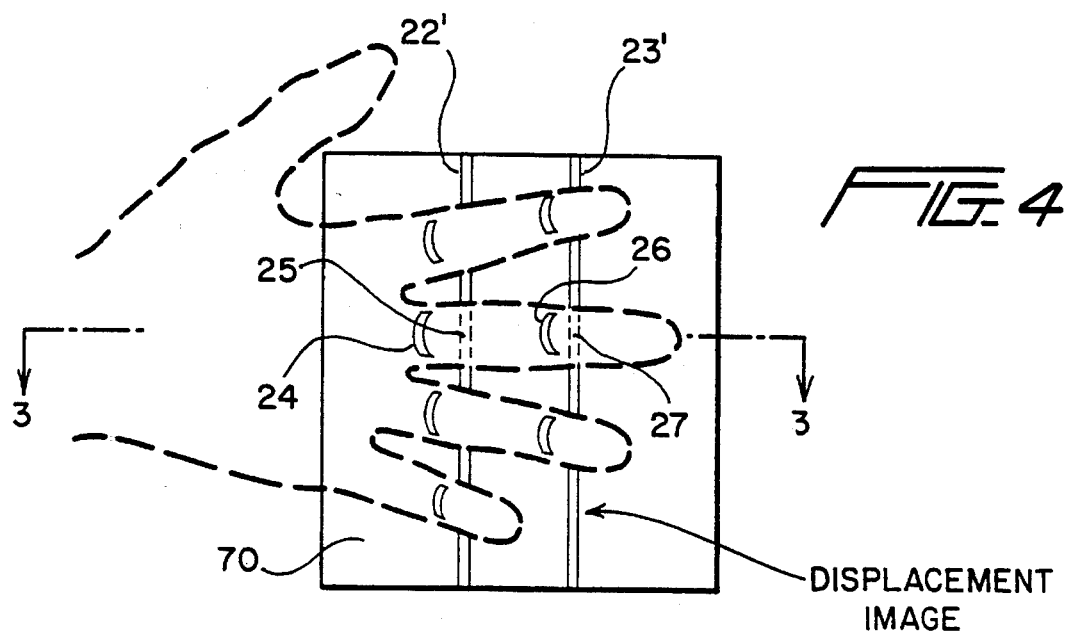

The embodiment of FIGS. 1–5 utilizes a structured light source which produces displacement image in the form of a displacement of a bright image element as shown in FIGS. 3 and 4. This embodiment can be considered to have the combination of elements described above, but more specifically implemented in with the following specific elements.

Support means 70, typically a platen (but see FIG. 22 and the associated discussion below for alternatives) are provided for supporting a portion of a person's hand including at least a plurality of fingers in spread positions as shown in each of the figures. In this case the means for producing and storing a silhouette image comprises the following elements specifically: image capture means 11 for viewing said hand portion from a prearranged image viewing direction which is preferably directly above or sighting generally along the axis of the two central fingers in the field of view. A first illumination means, the silhouette image illumination means 12, is operative during a silhouette image capture period controlled by control interface means 31 for illuminating the hand portion to present a silhouette image as shown in FIG. 2 of the hand portion to said image capture means 11. A first storage means, i.e. silhouette image store means 13, is provided for storing at least a portion of the silhouette image. In general it is preferred that the entire image of a plurality of fingers and a portion of the back of the hand be stored. "Storage" of the silhouette image includes a number of possible storage schemes from storing each pixel to storing a compressed data version of the silhouette image using some data compression algorithm, such as run length or perimeter encoding. The apparatus also includes a specific combination of elements for producing and storing a displacement image, This combination is the image capture means 11, a second illumination means in the form of a structured light source 21A which is operative during a displacement image capture period (controlled by control interface means 31) for directing a structured light pattern onto at least one of the fingers from a prearranged direction substantially different from the image viewing direction. The result is presentation to image capture means 11 of a displacement image comprising an element of said structured light pattern striking a surface region of at least one of said fingers at a position (24 or 26) displaced from a precalibrated striking position (25 or 27) on a predefined background image plane in the absence of the finger. The magnitude of the position displacement provides the finger height characteristic data. The storage means in the form of displacement image store means 22, stores at least a portion of the displacement image, and in this case the image could be windowed if desired to store only the data associated with the portions of the displacement image that actually contain useful information.

The image analyzing and the storage of hand enrollment data and hand bid data to use in the comparison means involve elements of the invention as described above. These elements of the invention do not vary in form between the two embodiments, but of course the actual operation of the image analyzer means 30 may vary and the features involved in the hand enrollment data and hand bid data may be different for the two cases. The comparison and decision processes and algorithms may also be specific to the features that are extracted and stored in hand enrollment data store means 40 and hand bid data store means 50.

The embodiment of FIGS. 5–9 utilizes an illumination means which produces a displaced shadow image as shown in FIG. 9. The displaced shadow image means that a portion of one side of the fingers has a shadow displaced from that of the silhouette image produced by the silhouette image illumination means 12. This embodiment also uses a support means 70 for supporting a portion of a person's hand including at least a plurality of fingers in spread positions. In this case if the support means is not a platen it should include an optical background plane located a short distance behind said hand portion since a displaced shadow image needs to be formed as close to the underside of the hand as possible to avoid a degree of displacement which tends to obliterate the information as the displaced shadow merges with the shadow formed by the adjacent finger.

In this embodiment the same combination of elements are utilized for producing and storing the silhouette image and the description will not be repeated. The means for producing and storing a displacement image comprises this combination of elements: the same image capture means 11 together with a second illumination means 21B which illuminates the support means 70 or an optical background plane and the fingers from a direction substantially different from the prearranged direction of the silhouette image illumination means 12 as best seen in FIG. 8. This results in a displaced shadow image of said hand portion being presented to image capture means 11. As shown the displaced shadow image has the outline of one side of each of said fingers of said hand portion displaced from the corresponding portion of said silhouette image. More specifically, the regions DS1 through DS4 shown as crosshatched regions in FIG. 9 represent the region of displaced shadow.

As shown in FIGS. 8 and 8A, the degree of displacement of the shadow image is related to the combination of the finger thickness and the height of the bottom of the finger above the support means or platen. The shadow displacement increases with increasing height of the shadow producing surface of the finger. Thus the amount of the shift between the silhouette image and the corresponding point on the displaced shadow image gives a basis for deriving finger height characteristics. The information in the silhouette image shown in FIG. 7 may be correlated with the information in the displaced shadow image of FIG. 9 in a number of ways. For example, the displaced shadow region itself may be determined by subtracting the silhouette image from the entire displaced shadow image and then analysis can be performed on just that image data.

Variations on the Structured Light Embodiment

Referring now to FIGS. 3 and 4 together with FIGS. 10 and 11, it will be seen that the embodiment of the invention which utilizes structured light can take a number of different specific forms. FIGS. 3 and 4 show schematically the generation of structured light in the form of two line segments 22 and 23. It should be apparent that only one such line segment could be utilized or more than two such line segments, placed closer together, could also be utilized. While the line segments 22 and 23 are shown as straight line segments parallel with the edges of platen 70, it should be apparent that curved line segment beams could be generated and straight line segment beams that are canted relative to the edges of the platen 70 could also be employed.

In FIG. 11, a plurality of finger guide devices 71, 72, and 73 are shown. These finger guide devices assist the person using the apparatus in achieving a consistent finger orientation. As a result, a structured light pattern in the form of individual beams of light may be utilized with the position at which such beams strike platen 70, shown as the dotted light spots 28A through 28F, oriented such that some portion of the beams will strike the top of a finger along the finger axis. The size and shape of the light beam and corresponding light spot produced need to be set such that fingers of varying width will be accommodated. The number of light beams in the pattern may be varied depending on the amount of finger height characteristic data that is needed or desired for a particular application of the invention. In general, the more light beams that are included in the structured light pattern, the more finger feature information that can be extracted.

Each of the displacement values $H11$ through $H32$ is a measure of a local finger height characteristics in the sense that the greater the height of the surface struck by a particular beam relative to the background image plane, the greater the displacement between the precalibrated spot on the image plane that would be struck by the beam in absence of the finger and the spot actually struck by the beam. As shown in FIG. 10, its bottom surface of a finger region is off of the image plane, the apparent finger height will be greater and the spot displacement will be larger. The structured light beam is unable to distinguish between the contribution from finger thickness and from a raised finger, but the feature data that can be obtained from this displaced image will be useful if the person's hand position is generally reproduced from one use of the machine to the next and particularly if the hand position during the hand enrollment operation cycle is reproduced during the hand bid operation cycle.

As shown in FIG. 10, the difference in beam impingement direction and image viewing direction produces the displacement and this difference needs to be substantial. However, this requirement of different viewing direction does not place any significant limitation on the system. It should be understood that there is benefit in using the same image capture means 11 for both the silhouette image and the structured light image, but it is not absolutely required that a single image capture means be used. Precalibration of the system is required in any event. It should also be understood that in this case of the use of a structured light source, it would be possible to merge the silhouette image and the displaced structured light image into one image and store the combined image in a single storage means. Depending on the components used, both images could be presented simultaneously to the image capture means 11 and stored in a single image store means.

Double-Sided imaging System Alternative As described above, structured light may be employed to strike the upper surface of the hand and fingers. Alternatively, it may be employed to strike the underside of the hand (palm) or the underside of the fingers. It can also be arranged to strike both sides of the fingers at the same time, enabling true thickness features to be derived from displacement measurements. One, two or more image sensors can be used as well as one, two or more sources of structured light. FIGS. 12A and 12B illustrate one double sided imaging embodiment, using two sources of structured light 21B, 21C and one image capture means 11.

In this embodiment, the hand rests on a hand support 75 consisting of a glassplate which is transparent to the wavelengths of light being used. Plate 75 carries a finger location peg 77 of a known and calibrated height, and the finger lies adjacent to it. Plate 75 is spaced above an optical background plane 76, which is retroreflective and enables silhouette images to be captured by image capture means 11 using an appropriate illumination means (not shown). This spacing enables mirror 78 and structured light source 21C to be situated below the general level of the hand resting on support 75. Structured light source 21B directs a line segment pattern onto the top of peg 77 and the area adjacent where a finger is expected to be placed. Structured light source 21C directs a line segment pattern onto the underside of peg 77 and the area adjacent where the underside of the finger is expected to lie. Mirror 78 is angled so that light from the underside of the finger and from the underside of the peg is reflected toward the image capture means 11. The field of view of the image sensor includes the top surfaces of the finger and peg, and also the mirror 78 showing the undersides of the finger and peg.

When illuminated, the structured light patterns on the finger exhibit displacements from the structured light patterns on the top and undersides of the peg. These appear in a composite image to the image sensor, and analysis of this image together with knowledge of the height of the peg enables both finger height characteristics and finger thickness features to be measured.

General Operation Sequence

The use of the apparatus of this invention generally involves first performing a hand enrollment operation cycle in which the person is enrolled on the system. The person presents his hand in the machine and hand enrollment data is taken and stored. The machine automatically takes both the silhouette image and the displacement image of the hand being enrolled and performs the image analysis and storage functions. As an alternative to capturing one set of images, a plurality of sets of images can be taken with the hand in slightly different positions each time. Hand enrollment data sets corresponding to each may be stored and later used in the hand bid operation cycle.

During a hand bid operation cycle, the person presents his hand to the machine and the machine goes through the image taking and analysis process and stores the hand bid data. To determine if the machine recognizes the person based on the hand presented, the machine requests input of a PIN code by the person to use to find the hand enrollment data corresponding to that person if the machine is operating in a verification mode. The PIN code may be entered by a keyboard such as keypad 41 shown in FIG. 5 or by any other input device, such as a card reader, bar code wand reader, or the like. If the machine is operating in an identification mode, the machine compares the hand bid data with a plurality of hand enrollment data sets to determine if the machine can automatically identify the person as one who has been previously enrolled. All hand enrollment data sets may be checked and compared with the hand bid data until the machine finds the one which sufficiently matches or else rejects the hand bid data as relating to a person not enrolled. Alternatively, the machine may be set up to store hand enrollment data in subsets based on some hand feature data and then that hand feature data is used to recall the pertinent data sets for comparison purposes.

Specific Embodiment

Referring now to FIGS. 13–18, a specific embodiment of two-finger version of a hand analyzing apparatus 100 in accordance with this invention will be described. Platen 101 has a retro-reflective surface 102 formed thereon. As shown in FIG. 14, platen 101 is curved from front to back to provide a natural feeling support surface for two fingers of a person's hand. An illumination and image capture assembly 103, shown in detail in FIG. 18, is mounted in a central position above platen 101 as best seen in FIGS. 14 and 16 and is supported on mounting support 103A.

As shown in FIGS. 13 and 14, a top housing and support arrangement 104 includes in its interior a mirror 107 mounted to the underside of a support plate 115. A structured light illumination arrangement 108 is mounted above and to the right of the illumination and image capture assembly but underneath mirror 107. As shown in FIG. 14, support plate 115 is mounted at an angle such that the light from illumination and image capture assembly 103 will be reflected by mirror 107 and produce substantially uniform illumination of platen 101. It should be understood that other arrangements of illumination and image capture assembly 103 and mirror 107 could also be used such as the one shown in FIGS. 19 and 20 and described below. FIGS. 19 and 20 also show the use of other types of structured light source arrangements.

Structured light illumination arrangement 108 comprises a plurality of pairs of light emitting diodes 109A, 109B, 109C which are mounted within a light baffling arrangement 110. The LEDs are recessed within the baffle arrangement so that the light emitted therefrom is blocked by the baffles from directly striking mirror 107 or platen 101. The forward openings 111A, 111B, and 111C permit light from the LEDs to travel generally parallel to mirror 107 to pass through cylindrical lens 114 which is mounted in front of a forward edge of mirror 107 so as not to interfere with imaging of the platen by the image capture assembly. Mirror 113 mounted forward of cylindrical lens 114 reflects the three line segment beams formed in lens 114 onto platen 101. Strictly speaking, each of the LEDs is focused into a separate line segment but these line segments from each side by side pair of LEDs overlap to form one line segment beam at the platen as shown in FIG. 17. Separate baffles 114A and 114B on lens 114 block light paths from the LEDs to the mirror 113 except those which pass through lens 114. This precludes unwanted light reaching platen 101 via mirror 113. A finger placement peg 106 is mounted on platen 101 to assist in reproducible positioning of two fingers in the orientation shown in FIG. 17. By placing the two fingers with sidewall portions touching peg 106, and with the web support portion of the fingers on the forwardmost part of the platen 101, good reproducibility of finger positioning from one hand presentation time to the next is assured. With the base joint portions of the fingers supported on the forward portion of the platen 101, the weight of the hand is supported in this area which is less deformable than the fleshy parts of the fingers. The combination of this support with the curved platen gives good finger size and width reproduction from one hand presentation to another. The overall platen support arrangement with the tapered front wall permits placement of the other fingers of the presented hand in either a folded orientation or a spread orientation. Also, the fingers presented may be the first two fingers of either right or left hand.

It should be understood that this structured light source arrangement could be modified to produce different forms of structured light, such as fewer or more line segment beams or other structured light patterns such as the one shown in FIG. 11. These could be generated by suitable arrangements of light sources, baffles, and beam forming lenses and mirrors. It will be appreciated that the folded optics arrangements shown in the Figures conveniently reduce the overall size of the apparatus, but are not essential. The placement of the structured light source arrangement 108 underneath mirror 107 provides a compact unit, but is not essential. Placement above the mirror could be provided with basically the same folded optics arrangement. Also, direct illumination arrangements using just a light source and lens could be implemented if desired and if space constraints are not present.

Referring to FIG. 18 one arrangement of the component parts of illumination and image capture assembly 103 will be described. A plurality of light emitting diodes 130 are arranged in a circular configuration and mounted on a circular support plate 131. Aperture plate 132 has an image forming aperture 133 formed in the center thereof and rests on a shoulder of lens holding cylinder 136. A retaining circlip 134 is employed to press support plate 131 and aperture plate 132 down onto shoulder 136A to retain lens 135 in position. Lens holding cylinder 136 has a central aperture 1365 formed therein so that the image formed by light entering through aperture 133 is focused by lens 135 onto an image capture device 139. Image capture device 139 is mounted on a circuit board 138 which is mounted to the bottom of outer support cylinder 137. A set screw 140 is used to retain lens holding cylinder 136 in a position in which the image is accurately focused onto image capture device 139. Table I below contains a listing of component types which have been used in constructing a working prototype of this invention.

TABLE I

| COMPONENT TYPE EXAMPLES | |
|---|---|
| light emitting diodes 109: | Opto Diode Corporation, U.S.A., Part No. 0D-8810, (wavelength = 880 nanometers) |
| light emitting diodes 130: | Opto Diode Corporation, U.S.A., Part No. 0D-8811, (wavelength = 880 nanometers) |
| mirrors 107 and 113: | "Standard" 2 mm thick mirror section. |
| cylindrical lens 114: | Combined Optical Industries, Ltd., Slough, U.K. Part No. 5571 |
| lens 135: | Edmunds Scientific Co., U.S.A., Part No. C32,402 (f = 3.8 mm) |
| image capture device 139: | Texas Instruments, Austin, TX, U.S.A., TC211 with an optical filter from Kodak available from Comar Instruments, U.K. Wratten filter No. 87, Comar Part No. 794WY75 (cut-off < 794 nm) |
| retroreflective surface 102: | 3M Corp., Scotchlite 68010 |

It should be understood that these are given by way of example, and other parts from other suppliers having substantially the same or even improved performance could be employed.

The LED components used in a working prototype emit infrared light at 880 nm. It should be understood that this invention is not limited to the use of any particular wavelength of light and, for example, LEDs which emit light in the visible red region could also be used. Infrared is preferred for the structured light source because it scatters and reflects well off of all types of skin colors.

It should also be understood that other illumination arrangements could be used to produce the silhouette image. For example, platen 101 with its retro-reflective surface 102 could be replaced with an electroluminescent screen or other uniform planar light source which would produce a shadow image of a hand portion placed thereon.

FIGS. 19 and 20 illustrate one alternative embodiment of the optical image forming components of this invention. In this arrangement, a curved platen 145 is provided along with finger orientation pegs 146. The combination of these features assists the persons using the device to achieve consistent finger positioning both in the sense of orientation of the fingers and maintaining contact of the bottom surface of the fingers with the platen. More reproducible imaging of the person's hand is thus achieved.

In this embodiment the illumination and image capture assembly 103 is positioned at the center rear region of platen 145, which illustrates that various placements of the optical components are possible. Structured light arrangement 108 utilizes the same components as the arrangement previously described and these will not be repeated here.

As shown in FIG. 20, a mirror rotation means 148 is optionally utilized to provide controllable rotation of mirror 113 and thus to scan the structured light beam 120 across the fingers. One use of this arrangement involves moving the structured light beam to various registered finger locations for multiple measurements of finger height characteristics. The registered finger locations are preprogrammed into the system. Using this approach gives more finger locations at which finger height characteristics are determined.

Alternatively, by cross referencing information from the silhouette image, such as the position of a finger tip the structured light beam is scanned to a position on the platen 145 which is a predetermined distance from one of the fingertips and finger height characteristic data is thus taken at a consistently reproducible location on the associated finger. The hand feature data derived from the structured light displacement image data is thus more reproducible and produces more accurate discrimination.

FIG. 21 shows a displacement image arising from one arrangement of a structured light pattern combined with the outline of a corresponding silhouette image. The dotted circles 160 represent finger location pegs which may optionally be employed. The dotted line segment 161 shows the position of a structured line segment during a calibrating image capture, and subsequent calibration analysis can be used to find the centerline 162 of this undisplaced line segment. The line segment 161 intersects three fingers of the hand, resulting in displacement bright region patches 163-165. The general distance of each of these patches away from the calibration centerline is a measure of the finger height characteristic of each finger in the region of intersection.

One technique to define a general distance is to analyze the bright region to find its centroid, and then to measure the distance of the centroid from the calibration line 162. The resulting distance is approximately proportional to the height of the centroid of the bright patch above the optical background plane. While generating a useful indicative measure of the finger thickness, this technique suffers from inconsistencies arising from changes of shape of the bright region as each hand presentation varies slightly.

FIG. 21 also illustrates an improved technique based on characteristics derived from the silhouette image. First the silhouette image is analyzed to derive axis lines 166–168 for each finger. Techniques for doing this type of analysis are set out in the SRI Report referenced above and it is not necessary to describe them further here. As the geometry of the displaced image and the silhouette image are identical, the displaced image may be analyzed by examining each finger along its axis line to find the intersection of the axis with the displacement bright region patch. For the first finger this enables points SA and SB to be found, and their position can be averaged to produce point S1. The distance SL12 from SA to the calibration center line can now be found. This is approximately proportional to the finger height at point S1. The other fingers may be treated in a similar manner. The use in this way of the silhouette geometry to guide the measurement of finger height characteristics enables each characteristic to be measured from a more consistent location, thereby improving discrimination and accuracy.

It will be apparent to persons of ordinary skill in the pertinent art that various alternatives in addition to those described above could be employed with this invention. For example, FIG. 22 illustrates an alternative hand support arrangement 150 comprising a combination of a palm support 151 and a plurality of separate finger supports 152 which together support a person's hand a distance above background image plane 153. This type of hand support arrangement also serves the function of finger guide means which assist a person using the machine to achieve reproducible finger orientation. It should be apparent that various other hand support arrangements could also be utilized.

Figure 5:
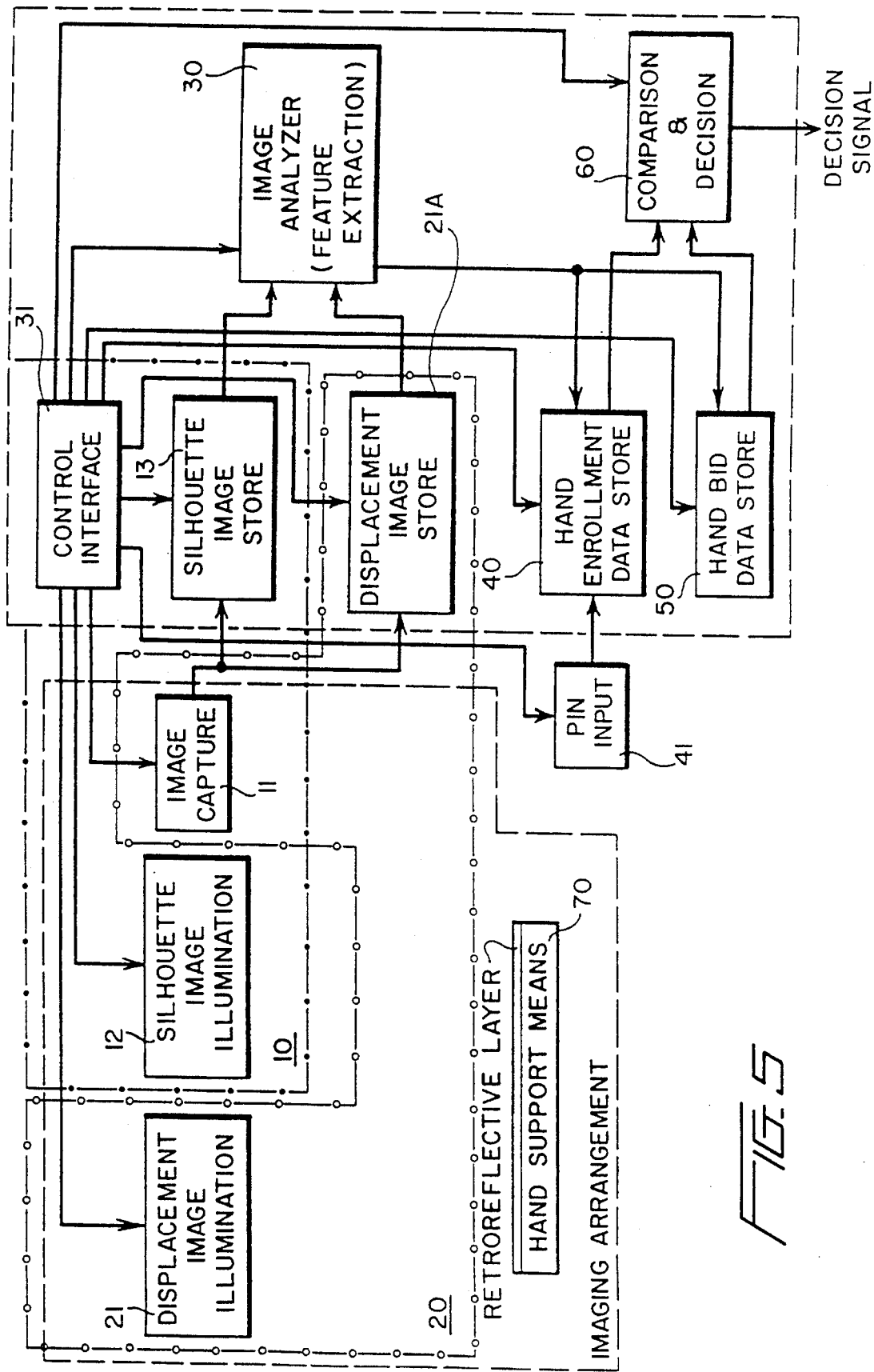
FIG. 5 is a block schematic diagram showing an overall system of apparatus in accordance with this invention and useful in illustrating general principles of operation of the invention.

While FIG. 5 illustrates a number of functional blocks involved in controlling a system in accordance with this invention. While these functional blocks could be implemented using discrete logic components, a dedicated microcomputer or microcontroller arrangement is preferred. The organization of such a microcomputer system, including microprocessor, operating program memory, data memory, and various input/output interfaces is well known to persons of skill in this art and need not be shown or described here. The programming of such a microcomputer system to achieve dedicated functions for application to this invention is well within the ordinary skill of real time operating system software engineers and the details of such a program are not given here.

This invention has been described above in terms of its general principles and several embodiments and variations thereon. These descriptions are given by way of example only and not of limitation. Persons of skill in the art to which this invention pertains could make numerous changes without departing from the scope of this invention as claimed in the following claims.

I claim:

1. Biometric measuring apparatus for recognizing a person's identity based on measurements performed on the person's hand, said apparatus comprising:

means for producing and storing a silhouette image of at least a portion of a person's hand including at least one finger to provide a stored silhouette image, means for producing and storing a displacement image of the same portion of a person's hand to provide a stored displacement image from which measurement data on finger height characteristics can be derived;

means for analyzing said stored silhouette image and said stored displacement image to produce hand feature data, including hand feature data derived at least in part from said measurement data on finger height characteristics derived from said stored displacement image;

means for storing hand enrollment data comprising said hand feature data obtained during a hand enrollment operation cycle;

means for storing hand bid data comprising said hand feature data obtained during a hand bid operation cycle; and means for comparing hand bid data with hand enrollment data to decide on the basis of prearranged decision criteria whether said hand bid data and said hand enrollment data were produced by the same hand portion.

2. Apparatus as claimed in claim 1, further comprising support means for supporting a portion of a person's hand including at least a pair of fingers in spread apart positions;

and wherein said means for producing and storing a silhouette image comprises:
 image capture means for viewing said hand portion and said support means from a prearranged first viewing direction;
 first illumination means for illuminating said hand portion and said support means during a silhouette image capture period to present a silhouette image of said hand portion to said image capture means; and
 storage means for storing at least a portion of said silhouette image presented to said image capture means to provide said stored silhouette image;

said means for producing and storing a displacement image comprises:
 said image capture means for viewing said hand portion and said support means during a displacement image capture period;
 second illumination means for directing a structured light pattern onto at least one finger from a prearranged direction substantially different from said first viewing direction to present to said image capture means a displacement image comprising an element of said structured light pattern striking a surface region of at least one finger at a position displaced from a precalibrated striking position on said support means in the absence of a finger presented on said support means, the magnitude of said position displacement providing said finger height characteristic data; and
 storage means for storing at least a portion of said displacement image to provide said stored displacement image for later analysis using said stored silhouette image as a guide.

3. Apparatus as claimed in claim 2, wherein said support means is a platen having a substantially retro-reflective surface and a two dimensional area for supporting at least a pair of fingers;

said first illumination means comprises a circular array of light sources for producing a substantially uniform flood lighting of said platen and any hand portion placed thereon;

said image capture means comprises an image forming lens and an image sensing device mounted coaxial with said circular array of light sources; and said second illumination means comprises a second array of light sources, aperture means mounted in front of said second array of light sources for forming light emitted from said array of light sources into a structured light pattern, and lens means mounted in the path of said light emitted from said second array of light sources through said aperture means for focussing said structured light pattern onto said platen and any hand portion placed on said platen.

4. Apparatus as claimed in claims, wherein said first illumination means further comprises a first mirror supported in a prearranged orientation above said platen, and wherein said circular array of light sources is mounted in a prearranged location generally adjacent said platen and oriented to direct output light beams emitted therefrom onto said first mirror to be reflected onto said platen; and wherein said second illumination means further comprises a second mirror supported in a prearranged orientation above said platen and generally adjacent said first mirror for directing said structured light pattern onto said platen.

5. Apparatus as claimed in claim 3, wherein said platen has a curvilinear shape from front to back thereof for aiding in positioning a hand portion such that major portions of the bottom surfaces of the fingers are substantially in contact with said retroreflective surface.

6. Apparatus as claimed in claim 5, further comprising finger guide means carried on said platen for assisting in positioning a hand portion inserted thereon with consistently reproducible finger orientations from one hand insertion to another.

7. Apparatus as claimed in claim 3, wherein said aperture means comprises at least one elongated slit to form said light from said second array into a structured light pattern comprising at least one line segment beam, and said lens means focuses said line segment beam onto said platen at a region such that the line segment beam intersects at least one finger of a person's hand presented on said platen.

8. Apparatus as claimed in claim 7, wherein said aperture means comprises a plurality of separated elongated slits to form said light from said array into a structured light pattern comprising a plurality of separate line segment beams, and said lens means focusses said separate line segment beams onto said platen such that each of said line segment beams intersects a plurality of fingers of a person's hand presented on said platen at different positions along the axis of each of said fingers.

9. Apparatus as claimed in claim 3, further comprising finger guide means carried on said platen for defining finger orientations and thereby to assist a person in achieving generally reproducible finger orientations during presentation of the person's hand on said platen during said hand enrollment operation cycle and during subsequent hand bid operation cycles;

said aperture means comprises at least a plurality of separated apertures of preselected geometry to form said light from said second array into a structured light pattern comprising a plurality of separate light beams which form small light spots upon striking said platen and upon striking fingers of a person's hand presented thereon using said finger guide means, and said lens means focusses said separate light beams onto said platen at locations corresponding to said defined finger orientations.

10. Apparatus as claimed in claim 3, wherein said second illumination means further comprises means for scanning said structured light pattern relative to said platen to enable a plurality of hand enrollment data sets to be obtained during a hand enrollment operation cycle with each data set corresponding to a different position of said structured light pattern striking fingers of a person's hand presented on said platen.

11. Apparatus as claimed in claim 3, wherein said displacement image capture period is a separate period following said silhoutte image capture period;

said second illumination means further comprises scanning means for scanning said structured light pattern relative to said platen;

and said apparatus further comprises:

means operative during said displacement image capture period for utilizing finger position informaton derived from said stored silhoutte image to control said scanning means to move said structured light pattern to a preselected position on at least one of said fingers presented on said platen.

12. Apparatus as claimed in 1, wherein said means for storing hand enrollment data comprises means for storing a plurality of hand enrollment data sets, each of said hand enrollment data sets being associated with one of a plurality of slightly different finger positions of the same person's hand produced by multiple presentations of said hand on said platen so that said plurality of hand enrollment data sets may be utilized to produce more useful hand enrollment data during said hand enrollment operation cycle.

13. Apparatus as claimed in claim 1, wherein said means for analyzing said stored silhoutte image and said stored displacement image includes means for first analyzing said stored silhouette image to produce prearranged finger feature data and means for thereafter analyzing said stored displacement image using said prearranged finger feature data as a guide to analysis of said stored displacement image.

14. Apparatus as claimed in claim 1, further comprising support means for supporting a portion of a person's hand including at least a pair of fingers in spread apart positions, said support means including an optical background plane located a short distance behind said hand portion;

and wherein said means for producing and storing a silhouette image comprises:

image capture means for viewing said hand portion and said optical background plane from a prearranged direction;

first illumination means for illuminating said hand portion and said optical background plane from a prearranged direction substantially normal to said optical background plane to present a silhouette image of said hand portion to said image capture means; and storage means for storing at least a portion of said silhouette image presented to said image capture means to produce a stored silhouette image;

and said means for producing and storing a displacement image comprises:

said image capture means; and a second illumination means for illuminating said hand portion and said optical background plane from a direction substantially different from said prearranged direction to present a displaced shadow image of said hand portion to said image capture means, said displaced shadow image having the outline of the shadow of one side of each of said fingers of said hand portion displaced from the corresponding portion of said silhouette image and, storage means for storing at least a portion of said displaced shadow image to produce a stored displacement image which can be analyzed relative to said stored silhouette image to provide said measurement data on finger height characteristics.

15. In biometric measuring apparatus for recognizing a person's identity based on measurements of the person's hand, the combination comprising:

support means on which at least a portion of the hand of a person including at least a pair of fingers may be placed;

image capture means for viewing said support means from a prearranged image viewing direction and for capturing and storing an image of a hand portion placed thereon;

first illumination means for illuminating said support means and a hand portion placed thereon to present to said image capture means a silhouette image of said hand portion;

second illumination means for illuminating said support means and a hand portion placed thereon to present to said image capture means a displacement image of said hand portion which can be correlated with said silhouette image to provide measurement data on finger height characteristics;

image acquisition means coupled to said image capture means, said first illumination means and said second illumination means for operating said image capture means and said first illumination means during a silhoutte image capture period to acquire and store said sihouette image of said hand portion to produce a stored silhouette image, and for operating said image capture means and said second illumination means during a displacement image capture period to acquire and store said displacement image of said hand portion to produce a stored displacement image.

16. Apparatus as claimed in claim 15, further comprising image analyzing means for first analyzing said stored silhouette image and for subsequently analyzing said stored displacement image using said stored silhouette image as a guide to produce hand feature data derived from both said stored silhouette image and said stored displacement image.

17. Apparatus as claimed in claim 16, further comprising means for storing hand enrollment data comprising hand feature data obtained during a hand enrollment operation cycle of said apparatus based upon an initial presentation of a person's hand on said support means;

means for storing hand bid data comprising hand feature data obtained during a hand bid operation cycle of said apparatus based upon a subsequent presentation of said person's hand on said support means; and means for comparing hand bid data with hand enrollment data to decide-on the basis of prearranged decision criteria whether said hand bid data and said hand enrollment data were produced by the same person's hand.

18. Apparatus as claimed in claim 16, wherein said image analyzing means for analyzing said stored silhouette image and said stored displacement image includes means for first analyzing said stored silhouette image to produce prearranged finger feature data and means for thereafter analyzing said stored displacement image using said prearranged finger feature data as a guide to analysis of said stored displacement image.

19. Apparatus as claimed in claim 15, wherein said image capture means means comprises a first image capture device associated with said first illumination means and a second image capture device associated with said second illumination means; and said image acquisition means is coupled to both said first and second image capture devices and operates said first image capture device and said first illumination means during said silhouette image capture period and operates said second image capture device and said second illumination means during said displacement image capture period, said second illumination means directing a structured light pattern onto a hand portion presented on said support means and thereby producing a structured light form of displacement image from which measurement data on finger height characteristics can be derived without correlation with said silhouette image.

20. Apparatus as claimed in claim 15, wherein said second illumination means comprises means operative during a displacement image capture period for directing a structured light pattern onto at least one of a pair of fingers presented on said support means from a prearranged direction substantially different from said prearranged image viewing direction to present to said image capture means a displacement image comprising an element of said structured light pattern striking a surface region of at least one finger of said pair of fingers at a finger striking position displaced from a precalibrated background striking position on a predefined background image plane in the absence of said pair of fingers on said support means, the magnitude of the distance between said finger striking position and said background striking position providing said measurement data on finger height characteristics.

21. Apparatus as claimed in claim 20, wherein said support means is a platen having a substantially retro-reflective surface, the area of said platen being preselected to accommodate the entire length of two fingers of a hand placed thereon and said platen being curved from front to back to accommodate the natural curvature of human fingers in a relaxed state;

said first illumination means comprises a circular array of light sources mounted in a position above the back portion of said platen and a mirror mounted in a position above said light sources, said light sources being directed upward toward said mirror at an angle for producing a substantially uniform flood lighting of said platen and any hand portion placed thereon;

said image capture means comprises an image forming lens and an image sensing device mounted coaxial with said circular array of light sources and having a viewing direction toward said mirror for capturing a mirror image of said platen and any hand portion placed thereon; and said second illumination means comprises a light source array comprising at least a pair of light emitting diodes, light baffle means mounting said pair of light emitting diodes in side by side relation at a position above and to one side portion of said platen and below said mirror and having a forward baffle structure to form light from said diodes into a light beam directed generally parallel to said mirror and blocking light from said diodes from directly striking said mirror or said platen, a lens mounted forward of a front edge of said mirror and cooperating with said light baffle means to form a structured light beam pattern, and a second mirror mounted forward of said lens for directing said structured line beam pattern onto said platen at a prearranged position adapted for striking at least one finger of a person's hand when presented on said platen.

22. Apparatus as claimed in claim 21, further comprising finger guide means mounted on said platen for defining finger placement positions and thereby to assist a person in presenting two fingers of a hand in consistently reproducible finger positions during a hand bid operation cycle and thereby defining finger location regions on said platen;

said lens forms said light from said light source array into a structured light pattern comprising a plurality of separate light beams which are directed by said second mirror into small separated light spots illuminating said platen at preselected points within said finger location regions and thereby striking the fingers of a person's hand presented on said platen at substantially reproducible finger positions.

23. Apparatus as claimed in claim 21, wherein said second illumination means further comprises means for scanning said structured light pattern relative to said platen to enable a plurality of hand enrollment data sets to be obtained during a hand enrollment operation cycle.

24. Apparatus as claimed in claim 21, wherein said displacement image capture period is a separate period following said silhouette image capture period;

said second illumination means further comprises scanning means for changing the orientation of said second mirror to move said structured light beam pattern to different positions on said platen during said displacement image capture period;

and said apparatus further comprises:

means operative during said displacement image capture period for utilizing said stored silhouette image produced during said silhouette image capture period to control said scanning means during said displacement image capture period to move said structured light pattern to a preselected position relative to at least one feature on one of pair of fingers of a person's hand presented on said platen.

25. Apparatus as claimed in claim 21, wherein said lens is a cylindrical lens, and said cylindrical lens and second mirror combine to focus said light from said diodes into a line segment beam and to direct said line segment beam onto said platen at a region such that said line segment beam is positioned to intersect each of two fingers a person's hand when presented on said platen.

26. Apparatus as claimed in claim 25, wherein said light source array comprises a plurality of pairs of light emitting diodes, said light baffle means mounts each of said pairs of light emitting diodes at vertically separated positions and has separate forward baffle structures associated with each pair of light emitting diodes to form light emitted therefrom into separate beams directed through said cylindrical lens onto said second mirror and to block emitted light from directly striking said mirror or said platen, said cylindrical lens and said second mirror combining to focus each of said separate beams into line segment beams and to direct said line segment beams onto said platen such that each of said line segment beams is positioned to intersect each of two fingers of a person's hand presented on said platen at different locations along the axis of each of said fingers, said cylindrical lens being mounted in a baffle arrangement which precludes light from said diodes directly striking said second mirror without passing through said lens and thereby precludes forming unwanted light patterns on said platen.

27. Apparatus as claimed in claim 15, wherein said second illumination means illuminates said hand portion and said support means from an illumination direction substantially different from said prearranged image viewing direction to present a displaced shadow image of said hand portion to said image capture means, said displaced shadow image having the outline of the shadow of one side of each of said fingers of said hand portion displaced from the corresponding portion of said silhouette image whereby said stored displacement image can be analyzed in conjuction with said stored silhouette image to provide finger height characteristic data.

28. In a method for recognizing a person's identity based on measurements performed on the person's hand the steps of:

a. disposing a support means on which at least a portion of a person's hand including at least one finger may be presented;

b. illuminating said support means and said portion of a person's hand presented thereon with a substantially uniform flood of light to produce a silhouette image of said hand portion;

c. capturing and storing silhoutte image data representing said silhouette image to produce stored silhouette image data;

d. illuminating said support means and said portion of a person's hand presented thereon with a light source which produces a displacement image of said hand portion which displacement image can be correlated with said silhouette image to produce measurement data on finger height characteristics;

e. capturing and storing displacement image data representing said displacement image to produce stored displacement image data; and f. analyzing said stored silhouette image data and said stored displacement image data to produce hand feature data.

29. The method of claim 28, further comprising the steps of:

A. performing steps a. through f. during a hand enrollment operation cycle to produce hand enrollment data;

B. performing steps a. through f. during a subsequent hand bid operation cycle to produce hand bid data;

C. comparing said hand bid data with said hand enrollment data to decide on the basis of prearranged decision criteria whether said hand bid data and said hand enrollment data were produced by the same hand portion.

30. The method of claim 28, wherein said support means is a platen;

said step c. includes viewing said platen and said portion of a person's hand presented thereon from a prearranged viewing direction; and said step d. comprises illuminating said platen and at least one finger of said portion of a person's hand presented thereon with a structured light pattern directed at said platen from a direction substantially different from said viewing direction to produce a displacement image comprising an element of said structured light pattern striking a surface region of said at least one finger at a position displaced from a precalibrated striking position on a predefined background image plane in the absence of said at least one finger, the magnitude of said position displacement providing said finger height characteristic data.

31. The method of claim 30, wherein said platen is adapted to accomodate two fingers of a person's hand presented thereon and said structured light pattern comprises at least one line segment directed onto said platen to strike two fingers of a person's hand presented thereon.

32. The method of claim 30, wherein said structured light pattern comprises a plurality of separate line segments directed onto said platen to strike finger portions of a person's hand presented on said platen at separated finger locations.

33. The method of claim 30, further comprising the step of:

disposing finger orientation means on said platen for assisting a person in presenting a hand in a prearranged finger orientation thereon;

and wherein said structured light pattern is a pattern of spots directed onto said platen to strike points on said platen corresponding to said prearranged finger orientation and thereby to strike fingers of a person's hand presented on said platen at prearranged finger positions.

34. The method of claim 28, wherein said uniform flood of light in step b. is directed at said platen from a first direction;

said step c. includes viewing said platen and at least two fingers of a hand portion presented thereon from a prearranged viewing direction; and said step d. comprises illuminating said platen and said at least two fingers presented thereon with light from a direction substantially different from both said first direction and said viewing direction to produce a displaced shadow image of said two fingers when viewed from said prearranged viewing direction, said displaced shadow image having the outline of the shadow of one side of each of said two fingers displaced from the corresponding portion of said silhouette image and providing finger height characteristic data.

35. Biometric measuring apparatus for recognizing a person's identity based on measurements performed on the person's hand, said apparatus comprising:

means for producing a silhoutte image of at least a portion of a person's hand;

means for producing a displacement image of the same hand portion;

means for analyzing said silhouette image and said displacement image to produce hand feature data;

means for comparing hand feature data obtained during a hand bid cycle with hand feature data obtained during a previous hand enrollment cycle to determine if the person's hand was previously enrolled, 36. In a method for recognizing a person's identity based on measurements of performed on the person's hand, the steps of:

a. capturing a silhoutte image of at least a portion of a person's hand;

b. capturing a displacement image of said portion of a person's hand;

c. analyzing said silhouette image and said displacement image to produce hand feature data; and d. comparing hand feature data obtained during a hand bid cycle with hand feature data obtained during a previous hand enrollment cycle to determine if the person's hand was previously enrolled.

* * * * *